US012792052B2

(12) United States Patent
Gil

(10) Patent No.: US 12,792,052 B2
(45) Date of Patent: Nov. 10, 2026

(54) BATTERY EXCHANGE SYSTEM FOR UNMANNED VEHICLES

(71) Applicant: United Parcel Service of America, Inc., Atlanta, GA (US)

(72) Inventor: Julio Gil, Veldhoven (NL)

(73) Assignee: United Parcel Service of America, Inc., Atlanta, GA (US)

( * ) Notice: Subject to any disclaimer, the term of this patent is extended or adjusted under 35 U.S.C. 154(b) by 934 days.

(21) Appl. No.: 17/895,724

(22) Filed: Aug. 25, 2022

(65) Prior Publication Data

US 2023/0061386 A1 Mar. 2, 2023

Related U.S. Application Data

(60) Provisional application No. 63/237,392, filed on Aug. 26, 2021.

(51) Int. Cl.
*G05D 1/48* (2024.01)
*B60H 1/00* (2006.01)
(Continued)

(52) U.S. Cl.
CPC ........... *G05D 1/48* (2024.01); *B60H 1/00264* (2013.01); *B60L 53/80* (2019.02); *B64C 39/024* (2013.01);
(Continued)

(58) Field of Classification Search
CPC .. B64D 9/00; G05D 1/48; B64U 70/99; F25D 11/003; B60H 1/00264
(Continued)

(56) References Cited

U.S. PATENT DOCUMENTS 720,395 A 2/1903 Ash et al.
3,948,466 A 4/1976 Rudder et al.
(Continued)

FOREIGN PATENT DOCUMENTS

CH 508541 A 6/1971
CN 102785937 A 11/2012
(Continued)

OTHER PUBLICATIONS

International Search Report and Written Opinion received for PCT Patent Application No. PCT/US2022/041727, mailed on Dec. 13, 2022, 21 pages.
(Continued)

*Primary Examiner* — Richard V Muralidar
(74) *Attorney, Agent, or Firm* — Shook, Hardy & Bacon L.L.P.

(57) ABSTRACT

A system for swapping one or more batteries includes a battery holder configured to store a first battery, wherein the battery holder further includes retainers positioned proximate a front end and a rear end of the battery holder, the retainers having a first position and a second position such that the retainers, in the first position, are configured to engage the first battery in order to dispose the first battery in a storage position in the battery holder and, in the second position, are configured to disengage from the first battery to allow the first battery to move from the storage position. The system further includes cartridges having a front end and a rear end configured to couple to at least one of the front end and the rear end of the battery holder and further configured to hold a second battery in the second enclosure.

19 Claims, 15 Drawing Sheets

(51) Int. Cl.

| | |
|---|---|
| ***B60L 53/80*** | (2019.01) |
| ***B64C 39/02*** | (2023.01) |
| ***B64D 9/00*** | (2006.01) |
| ***B64F 1/02*** | (2006.01) |
| ***B64U 70/99*** | (2023.01) |
| ***F25B 21/02*** | (2006.01) |
| ***F25D 11/00*** | (2006.01) |
| ***G05D 1/00*** | (2006.01) |
| ***G05D 1/249*** | (2024.01) |
| ***G05D 1/43*** | (2024.01) |
| ***G05D 1/46*** | (2024.01) |
| ***G05D 1/654*** | (2024.01) |
| *B64U 50/19* | (2023.01) |
| *B64U 70/00* | (2023.01) |
| *B64U 80/86* | (2023.01) |
| *B64U 101/60* | (2023.01) |
| *B64U 101/64* | (2023.01) |

(52) U.S. Cl.
CPC .................. *B64D 9/00* (2013.01); *B64F 1/02* (2013.01); *B64U 70/99* (2023.01); *F25B 21/02* (2013.01); *F25D 11/003* (2013.01); *G05D 1/0202* (2013.01); *G05D 1/0246* (2013.01); *G05D 1/0684* (2013.01); *G05D 1/101* (2013.01); *G05D 1/249* (2024.01); *G05D 1/43* (2024.01); *G05D 1/46* (2024.01); *G05D 1/654* (2024.01); *G05D 1/6542* (2024.01); *B64U 50/19* (2023.01); *B64U 70/00* (2023.01); *B64U 80/86* (2023.01); *B64U 2101/60* (2023.01); *B64U 2101/64* (2023.01); *B64U 2201/10* (2023.01); *F25D 2201/14* (2013.01); *H01M 2220/20* (2013.01)

(58) Field of Classification Search
USPC .......................................................... 320/107
See application file for complete search history.

(56) References Cited

U.S. PATENT DOCUMENTS

| | | | | |
|---|---|---|---|---|
| 4,416,197 | A | 11/1983 | Kehl | |
| 5,508,908 | A | 4/1996 | Kazama et al. | |
| 5,697,625 | A | 12/1997 | Otto | |
| 5,760,569 | A | 6/1998 | Chase, Jr. | |
| 5,799,909 | A | 9/1998 | Ziegler | |
| 5,868,357 | A | 2/1999 | Gabriel | |
| 6,179,357 | B1 | 1/2001 | Gabriel | |
| 6,310,771 | B1 | 10/2001 | Chien | |
| 6,554,151 | B1 | 4/2003 | Brennan | |
| 6,674,052 | B1 | 1/2004 | Luo | |
| 7,509,995 | B2 | 3/2009 | Bhatti et al. | |
| 7,631,444 | B1 | 12/2009 | Hursen | |
| 7,635,065 | B1 | 12/2009 | Pettinger | |
| 9,027,777 | B1 | 5/2015 | Steidinger | |
| 9,033,281 | B1 | 5/2015 | Adams | |
| 9,280,038 | B1 | 3/2016 | Pan et al. | |
| 9,387,928 | B1 | 7/2016 | Gentry et al. | |
| 9,412,280 | B1 | 8/2016 | Zwillinger et al. | |
| 9,525,605 | B2 | 12/2016 | Wu et al. | |
| 9,527,605 | B1 | 12/2016 | Gentry et al. | |
| 9,650,133 | B2 | 5/2017 | Fisher et al. | |
| 9,676,481 | B1 | 6/2017 | Buchmueller | |
| 9,688,404 | B1 | 6/2017 | Buchmueller et al. | |
| 9,957,048 | B2 | 5/2018 | Gil | |
| 9,969,494 | B1 | 5/2018 | Buchmueller et al. | |
| 9,981,745 | B2 | 5/2018 | Gil | |
| 10,040,370 | B2 | 8/2018 | Wei et al. | |
| 10,071,804 | B1 | 9/2018 | Buchmueller et al. | |
| 10,246,187 | B2 | 4/2019 | Cantrell et al. | |
| 10,274,952 | B2 | 4/2019 | Cantrell et al. | |
| 10,435,156 | B2 | 10/2019 | Bellof et al. | |
| 10,640,214 | B2 | 5/2020 | Lopez et al. | |
| 10,807,714 | B2 | 10/2020 | Atchley et al. | |
| 10,836,406 | B2 | 11/2020 | Lum et al. | |
| 10,899,449 | B2 | 1/2021 | Luckay et al. | |
| 11,187,200 | B1 | 11/2021 | Kolbe et al. | |
| 11,225,325 | B1 | 1/2022 | Evans, II | |
| 11,345,051 | B2 | 5/2022 | Zheng et al. | |
| 11,453,498 | B2 | 9/2022 | Martens | |
| 11,630,459 | B2 | 4/2023 | Georgeson et al. | |
| 11,667,383 | B2 | 6/2023 | Evans, II | |
| 12,195,198 | B2 | 1/2025 | Columbus | |
| 2005/0000967 | A1 | 1/2005 | Najd | |
| 2005/0023284 | A1 | 2/2005 | Heiberg et al. | |
| 2008/0083756 | A1 | 4/2008 | Daniels | |
| 2009/0198372 | A1* | 8/2009 | Hammerslag | G07F 15/005 700/226 |
| 2014/0091172 | A1 | 4/2014 | Arlton et al. | |
| 2014/0180914 | A1 | 6/2014 | Abhyanker | |
| 2015/0197389 | A1 | 7/2015 | Bao et al. | |
| 2016/0039300 | A1* | 2/2016 | Wang | G05D 1/2446 244/58 |
| 2016/0068264 | A1 | 3/2016 | Ganesh et al. | |
| 2016/0140851 | A1 | 5/2016 | Levy et al. | |
| 2016/0257423 | A1 | 9/2016 | Martin | |
| 2017/0015415 | A1 | 1/2017 | Chan et al. | |
| 2017/0029101 | A1 | 2/2017 | Weissenberg | |
| 2017/0038116 | A1 | 2/2017 | Ros | |
| 2017/0217323 | A1 | 8/2017 | Antonini et al. | |
| 2017/0313421 | A1 | 11/2017 | Gil | |
| 2017/0316375 | A1 | 11/2017 | Gil | |
| 2017/0349039 | A1 | 12/2017 | Rayner et al. | |
| 2017/0368959 | A1 | 12/2017 | Hara et al. | |
| 2017/0374731 | A1 | 12/2017 | Simpson et al. | |
| 2018/0002015 | A1 | 1/2018 | Mccullough et al. | |
| 2018/0062225 | A1 | 3/2018 | You et al. | |
| 2018/0105063 | A1 | 4/2018 | Wei et al. | |
| 2018/0160525 | A1 | 6/2018 | Satake et al. | |
| 2018/0265222 | A1 | 9/2018 | Takagi | |
| 2018/0312069 | A1* | 11/2018 | McClymond | B64U 50/39 |
| 2018/0370618 | A1 | 12/2018 | Harris | |
| 2019/0144007 | A1 | 5/2019 | Lum et al. | |
| 2019/0291865 | A1 | 9/2019 | O'Donnell | |
| 2020/0047353 | A1 | 2/2020 | Zheng et al. | |
| 2021/0197982 | A1 | 7/2021 | Sweeny et al. | |
| 2021/0229903 | A1 | 7/2021 | Goines, Jr. | |
| 2022/0035381 | A1 | 2/2022 | Okuno et al. | |
| 2022/0134899 | A1 | 5/2022 | Eide et al. | |
| 2022/0315209 | A1 | 10/2022 | Gil et al. | |
| 2022/0315222 | A1 | 10/2022 | Gil et al. | |
| 2022/0315246 | A1 | 10/2022 | Gil et al. | |
| 2022/0320669 | A1 | 10/2022 | Gil et al. | |
| 2022/0380063 | A1 | 12/2022 | Shah et al. | |
| 2023/0008634 | A1 | 1/2023 | Kabakov et al. | |
| 2023/0060684 | A1 | 3/2023 | Bell | |
| 2023/0063715 | A1 | 3/2023 | Bell | |
| 2023/0131957 | A1 | 4/2023 | Lowenberg et al. | |
| 2024/0387930 | A1 | 11/2024 | Bell | |

FOREIGN PATENT DOCUMENTS

| | | | |
|---|---|---|---|
| CN | 110398983 | A | 11/2019 |
| CN | 110963033 | A | 4/2020 |
| CN | 112230672 | A | 1/2021 |
| CN | 107750478 | B | 6/2021 |
| CN | 113183824 | A | 7/2021 |
| DE | 102017209263 | A1 | 12/2018 |
| EP | 1993940 | A1 | 11/2008 |
| EP | 2644438 | A2 | 10/2013 |
| EP | 2868577 | A1 | 5/2015 |
| EP | 3177528 | A1 | 6/2017 |
| FR | 2685547 | A1 | 6/1993 |
| FR | 3075170 | A1 | 6/2019 |
| GB | 2605454 | A | 10/2022 |
| JP | 53-45890 | A | 4/1978 |
| JP | 1-176720 | A | 7/1989 |
| JP | 2017-083063 | A | 5/2017 |
| JP | 6176309 | B2 | 8/2017 |
| JP | 7616699 | B2 | 1/2025 |
| KR | 10-1778883 | B1 | 9/2017 |

(56) References Cited

FOREIGN PATENT DOCUMENTS

| | | | |
|---|---|---|---|
| KR | 10-2019-0069968 | A | 6/2019 |
| KR | 10-2021105 | B1 | 9/2019 |
| KR | 10-2023-0164329 | A | 12/2023 |
| KR | 10-2024-0143483 | A | 10/2024 |
| WO | 95/21361 | A1 | 8/1995 |
| WO | 2015/061008 | A1 | 4/2015 |
| WO | 2015/158394 | A1 | 10/2015 |
| WO | 2015/158934 | A1 | 10/2015 |
| WO | 2016/019978 | A1 | 2/2016 |
| WO | 2020/184166 | A1 | 9/2020 |
| WO | 2020/235744 | A1 | 11/2020 |
| WO | 2021/101735 | A1 | 5/2021 |

OTHER PUBLICATIONS

International Preliminary Report on Patentability received for PCT Patent Application No. PCT/US2022/023688, mailed on Oct. 19, 2023, 11 pages.
International Preliminary Report on Patentability received for PCT Patent Application No. PCT/US2022/023690, mailed on Oct. 19, 2023, 9 pages.
International Preliminary Report on Patentability received for PCT Patent Application No. PCT/US2022/023692, mailed on Oct. 19, 2023, 08 pages.
International Search Report and Written Opinion received for PCT Patent Application No. PCT/US2022/040094, mailed on Dec. 1, 2022, 15 pages.
International Search Report and Written Opinion received for PCT Patent Application No. PCT/US2022/040477, mailed on Nov. 14, 2022, 13 pages.
International Search Report and Written Opinion received for PCT Patent Application No. PCT/US2022/041701, mailed on Jan. 26, 2023, 15 pages.
Invitation to Pay Additional Fees received for PCT Patent Application No. PCT/US2022/041701, mailed on Dec. 5, 2022, 9 pages.
Non-Final Office Action received for U.S. Appl. No. 17/711,730, mailed on Oct. 5, 2023, 10 pages.
Non-Final Office Action received for U.S. Appl. No. 17/711,733, mailed on Jan. 19, 2024, 10 pages.
Non-Final Office Action received for U.S. Appl. No. 17/818,848, mailed on Jan. 26, 2024, 13 pages.
International Preliminary Report on Patentability received for PCT Patent Application No. PCT/US2022/023994, mailed on Mar. 7, 2024, 9 pages.
International Preliminary Report on Patentability received for PCT Patent Application No. PCT/US2022/040094, mailed on Mar. 7, 2024, 12 pages.
International Preliminary Report on Patentability received for PCT Patent Application No. PCT/US2022/040477, mailed on Nov. 15, 2023, 19 pages.
International Preliminary Report on Patentability received for PCT Patent Application No. PCT/US2022/041701, mailed on Mar. 7, 2024, 11 pages.
International Preliminary Report on Patentability received for PCT Patent Application No. PCT/US2022/041727, mailed on Mar. 7, 2024, 16 pages.
Non-Final Office Action received for U.S. Appl. No. 17/821,980, mailed on Mar. 13, 2024, 5 pages.
Non-Final Office Action received for U.S. Appl. No. 17/711,739, mailed on Sep. 26, 2024, 8 pages.
Notice of Allowance received for U.S. Appl. No. 17/711,730, mailed on Oct. 1, 2024, 9 pages.
Final Office Action received for U.S. Appl. No. 17/711,739, mailed on Apr. 16, 2025, 10 pages.
Final Office Action received for U.S. Appl. No. 17/887,812, mailed on Feb. 13, 2025, 20 pages.
Non-Final Office Action received for U.S. Appl. No. 17/712,451, mailed on Mar. 10, 2025, 10 pages.
Notice of Allowance received for U.S. Appl. No. 18/788,975, mailed on Apr. 9, 2025, 8 pages.
International Search Report and Written Opinion received for PCT Patent Application No. PCT/US2022/023688, mailed on Jul. 12, 2022, 16 pages.
International Search Report and Written Opinion received for PCT Patent Application No. PCT/US2022/023690, mailed on Jun. 29, 2022, 14 pages.
International Search Report and Written Opinion received for PCT Patent Application No. PCT/US2022/023692, mailed on Jun. 21, 2022, 5 pages.
International Search Report and Written Opinion received for PCT Patent Application No. PCT/US2022/023994, mailed on Jul. 14, 2022, 13 pages.
Final Office Action received for U.S. Appl. No. 17/711,739, mailed on Feb. 19, 2026, 10 pages.
Non-Final Office Action received for U.S. Appl. No. 19/265,850, mailed on Feb. 19, 2026, 8 pages.
Notice of Allowance received for U.S. Appl. No. 18/799,857, mailed on Feb. 9, 2026, 9 pages.
Non-Final Office Action received for U.S. Appl. No. 17/711,739, mailed on Aug. 12, 2025, 9 pages.
Non-Final Office Action received for U.S. Appl. No. 17/887,812, mailed on Jun. 11, 2025, 19 pages.
Non-Final Office Action received for U.S. Appl. No. 17/887,812, mailed on Nov. 25, 2025, 19 pages.
Non-Final Office Action received for U.S. Appl. No. 18/799,857, mailed on Oct. 1, 2025, 10 pages.
Non-Final Office Action received for U.S. Appl. No. 19/000,216, mailed on Aug. 12, 2025, 6 pages.
Office Action received for Canadian Patent Application No. 3227086, mailed on Jun. 27, 2025, 5 pages.
Office Action received for Canadian Patent Application No. 3227893, mailed on Jul. 25, 2025, 5 pages.
Non-Final Office Action received for U.S. Appl. No. 18/917,708, mailed on Jan. 14, 2026, 5 pages.
Notice of Allowance received for U.S. Appl. No. 19/000,216, mailed on Dec. 3, 2025, 9 pages.
Non-Final Office Action received for U.S. Appl. No. 17/887,812, mailed on Jun. 5, 2026, 23 pages.

* cited by examiner

BATTERY EXCHANGE SYSTEM FOR UNMANNED VEHICLES

CROSS-REFERENCE TO RELATED APPLICATIONS

This application claims the benefit of priority to U.S. Provisional Application No. 63/237,392, filed Aug. 26, 2021, entitled "Pneumatic Platform and Delivery tubes for Unmanned Aerial Vehicles." The aforementioned application is expressly incorporated herein by reference in its entirety.

BACKGROUND

Unmanned Aerial Vehicles (UAVs) are used to deliver goods. Some UAVs are being used commercially to deliver parcels. Sometimes the majority of deliveries performed by UAVs include relatively small, light parcels.

UAVs have operated using several different power sources. Some examples include liquid fuel gasoline engines, solar panels, batteries, and fuel cells. Battery power sources are the most common power source for UAVs. One benefit to using batteries as a power source is that a battery can be charged while the UAV is not in use. However, when a battery gets depleted, it needs to be swapped with a charged battery to continue to provide the UAV with a source of power with little delay.

SUMMARY

In one embodiment, a system for swapping one or more batteries includes a battery holder configured to store a first battery, wherein the battery holder further includes retainers positioned proximate a front end and a rear end of the battery holder, the retainers having a first position and a second position such that the retainers, in the first position, are configured to engage the first battery in order to dispose the first battery in a storage position in the battery holder and, in the second position, are configured to disengage from the first battery to allow the first battery to move from the storage position; and one or more cartridges having a front end and a rear end configured to couple to at least one of the front end and the rear end of the battery holder and further configured to hold a second battery in the second enclosure, wherein when the one or more cartridges is decoupled from the battery holder, a retainer of the battery holder is in the first position, and wherein when the one or more cartridges is coupled to the battery holder, the retainer of the battery holder is in the second position.

In one embodiment, a battery holder comprising: a housing comprising: a front end having a front end opening; a rear end having a rear end opening, the housing extending between the front end and the rear end in a longitudinal direction; an inner surface that defines an interior space; one or more retainer member receptacles, each retainer member receptacle comprising a perimeter wall extending away from the inner surface and defining a chamber; one or more retainer members, each of the one or more retainer members comprising a first end and a second end, and configured to move between a first position and a second position, wherein in the first position, the one or more retainer members taper outward and away from the interior portion in the longitudinal direction from the first end to the second end, and wherein in the second position, the one or more retainer members are at least partially recessed within respective chambers of the one or more retainer member receptacles, the one or more retainer members comprising an electrically conductive material; and one or more electrical leads coupled to the electrically conductive material of the one or more retainer members and extending therefrom.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

UAVs are utilized for delivering items, including parcels and laboratory samples. Unmanned equipment such as a UAV, submersibles, ground vehicles, and the like are becoming truly autonomous. They are piloting themselves and identifying, among other things, their location, direction, and target destination. Most of these systems operate on a power source, such as a battery, to perform a wide range of applications. However, when the battery on the unmanned equipment is discharged, malfunctions, is running low on power source, or needs to be replaced for any reason, manual systems and methods are used to replace the power source. For any equipment, such as an unmanned system like a UAV, it can be beneficial to have a battery system and method to replace batteries from the equipment.

The present disclosure provides systems and methods that improve aspects of a battery exchange process for UAVs. Some embodiments of the present disclosure relate to, among other things, a system and a method to efficiently and effectively exchange batteries from a UAV. In one example, the battery exchange system disclosed herein allows any device such as a UAV to quickly and efficiently swap batteries from inside a battery holder that is coupled to a device such as a UAV. The battery from the battery holder can be transferred to an external device such as a cartridge and a replacement battery can be inserted into the battery holder from another cartridge. This can be performed in one move or multiple moves. Some embodiments of the present disclosure allow batteries to be swapped from any device quickly and efficiently.

It will be understood that, although the disclosure describes the technology in conjunction with UAVs, some technologies described herein are also suitable for use with ground vehicles (e.g., Unmanned Ground Vehicles (UGVs)) or manned vehicles, vehicles that go in the water, or any equipment that would require a battery change or any part to be changed. As such, the disclosed technology should not be limited to only applications involving UAVs, but instead, it should be more broadly interpreted for use with other applications where practical.

Figure 1:
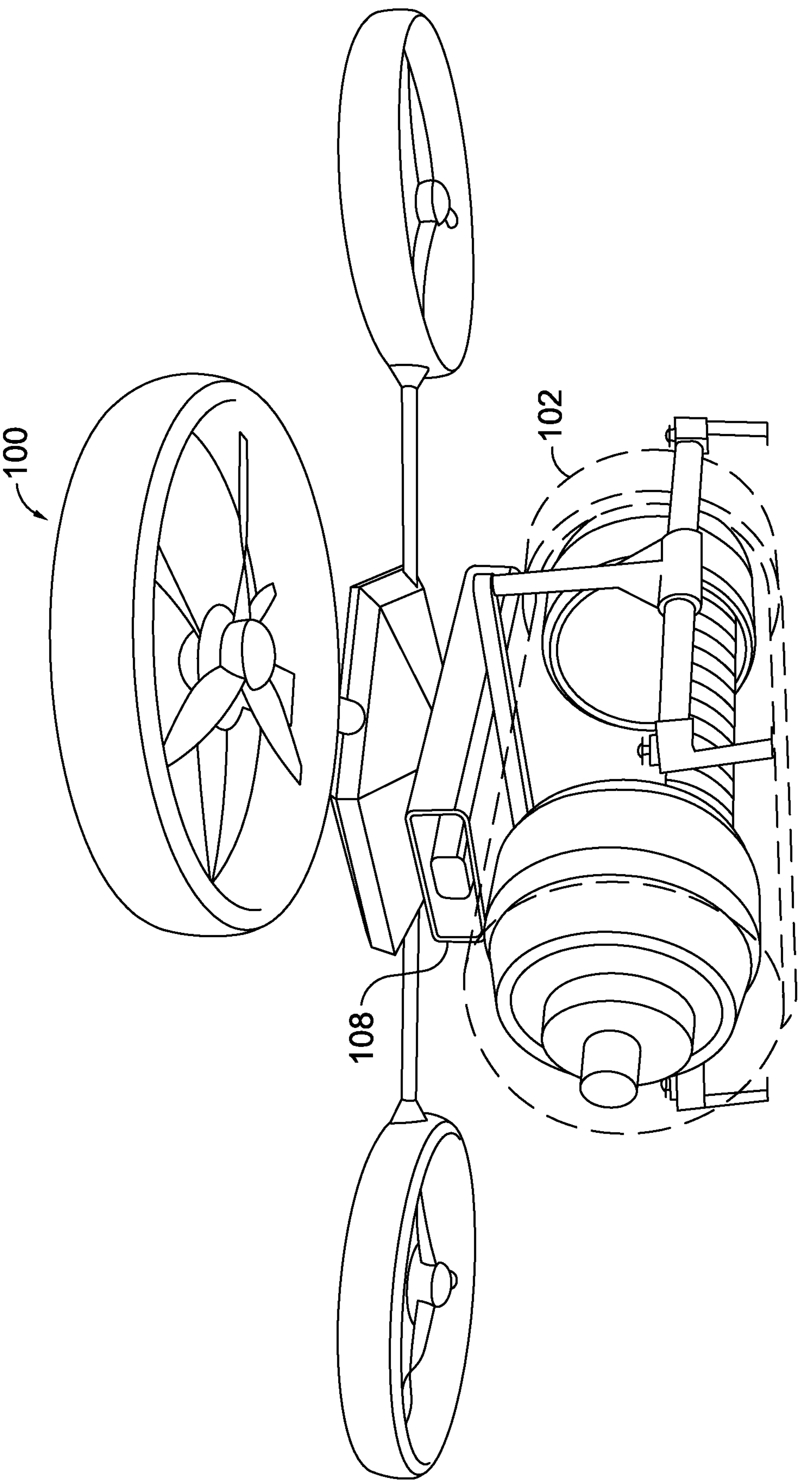
FIG. 1 is an example UAV for carrying payloads, in accordance with an embodiment described herein.

With reference now to the figures, FIG. 1 illustrates an example UAV for carrying payloads, in accordance with an embodiment described herein. The UAV 100 comprises a delivery tube 102 coupled to UAV 100. In one example, the delivery tube 102 or portions of the UAV 100 or any combination of them include a battery holder 108. The battery holder 108 can include a battery. In one example, the battery housing and the battery holder 108 are designed to snugly fit the battery when the battery is inserted into the battery holder 108. The battery holder 108 can connect through terminals or wirelessly to operate any portion of the UAV 100 or the delivery tube 102. In one example, multiple battery holders 108 can be present in the UAV 100 and used in a different portion of the UAV 100 or the delivery tube 102. It should be understood that the delivery tube 102 is a container to carry a load. The delivery tube 102 can be any shape.

Figure 2:
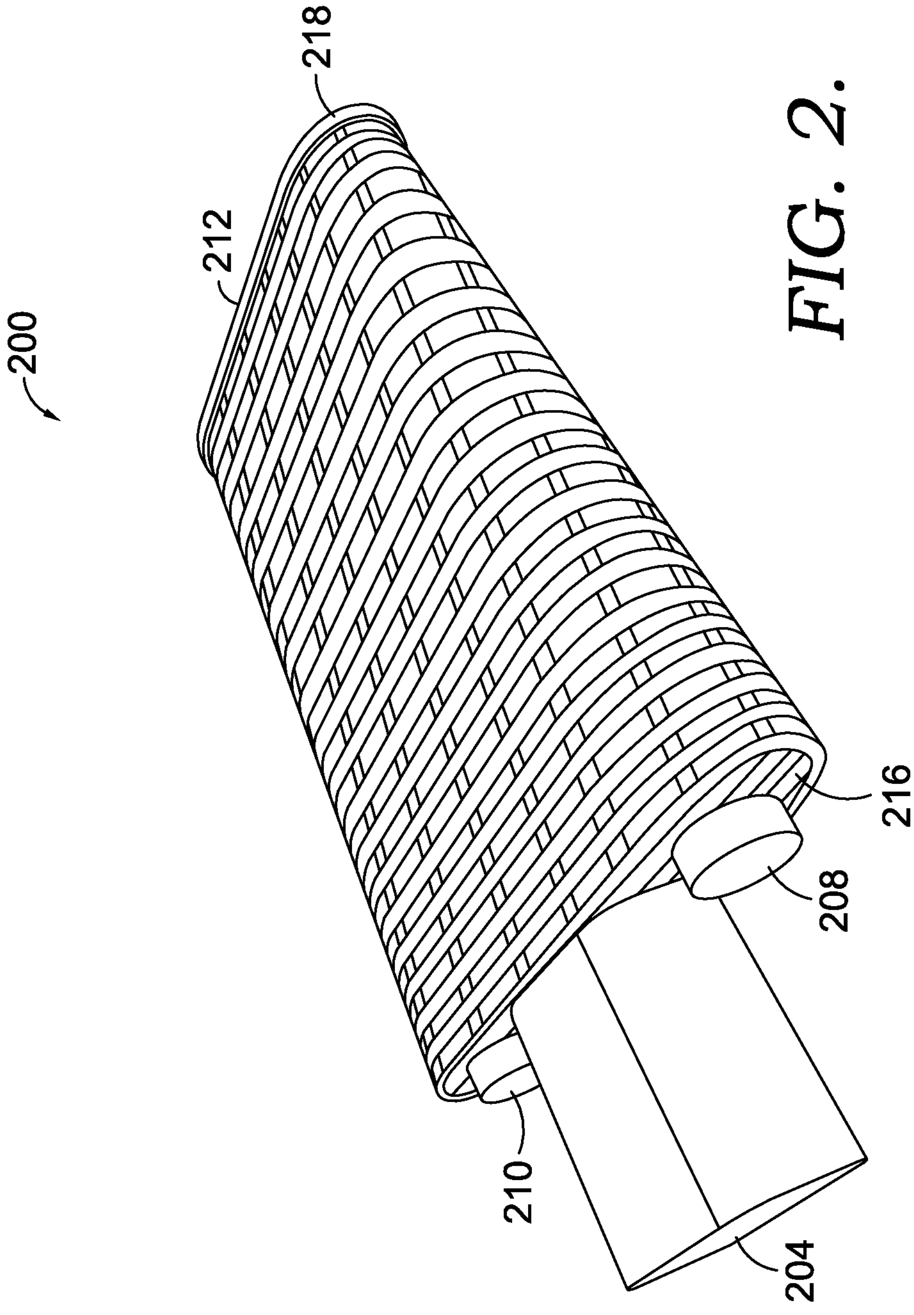
FIG. 2 illustrates an example battery, in accordance with an aspect described herein.

As illustrated in FIG. 2, an example battery 200 is depicted for use in implementing embodiments described herein. The battery 200 can be a rechargeable battery. The battery 200 comprises a front end 216 and a rear end 218. The front end 216 includes a front bumper 204 and battery terminals 208, 210. In one example, the front bumper 204 can be spring loaded. In one example, the front bumper 204 is aerodynamically shaped. In one example, the battery terminals 208, 210 can be terminals or any wireless terminal capable of wirelessly transfering power. In one example, the battery terminals 208, 210 can be circular in shape. It should be understood that the battery terminals 208, 210 can be any shape and can connect to front spring loaded retainers of a battery holder when the battery is in the battery holder, as will be further described.

The rear end 218 of the battery 200 can include a rear bumper 212. In one example, the rear bumper 212 is spring loaded. The rear bumper 212 can cause the battery 200 to snugly fit in different housings, such as the battery holder 108 (FIG. 1). The rear bumper 212 can comprise a foam or rubber material or any material that can be compressed. It should be understood that the rear bumper 212 can be made up of any material that can be compressed or move between multiple positions to allow the battery 200 to fit inside or even connect with the battery holder. It should be understood that the front bumper 204, battery terminals 208, 210, and the rear bumper 212 can be located anywhere on the battery 200. The battery 200 can also include multiple front bumpers 204, battery terminals 208, 210, and the rear bumpers 212 or none at all.

Figure 3A:
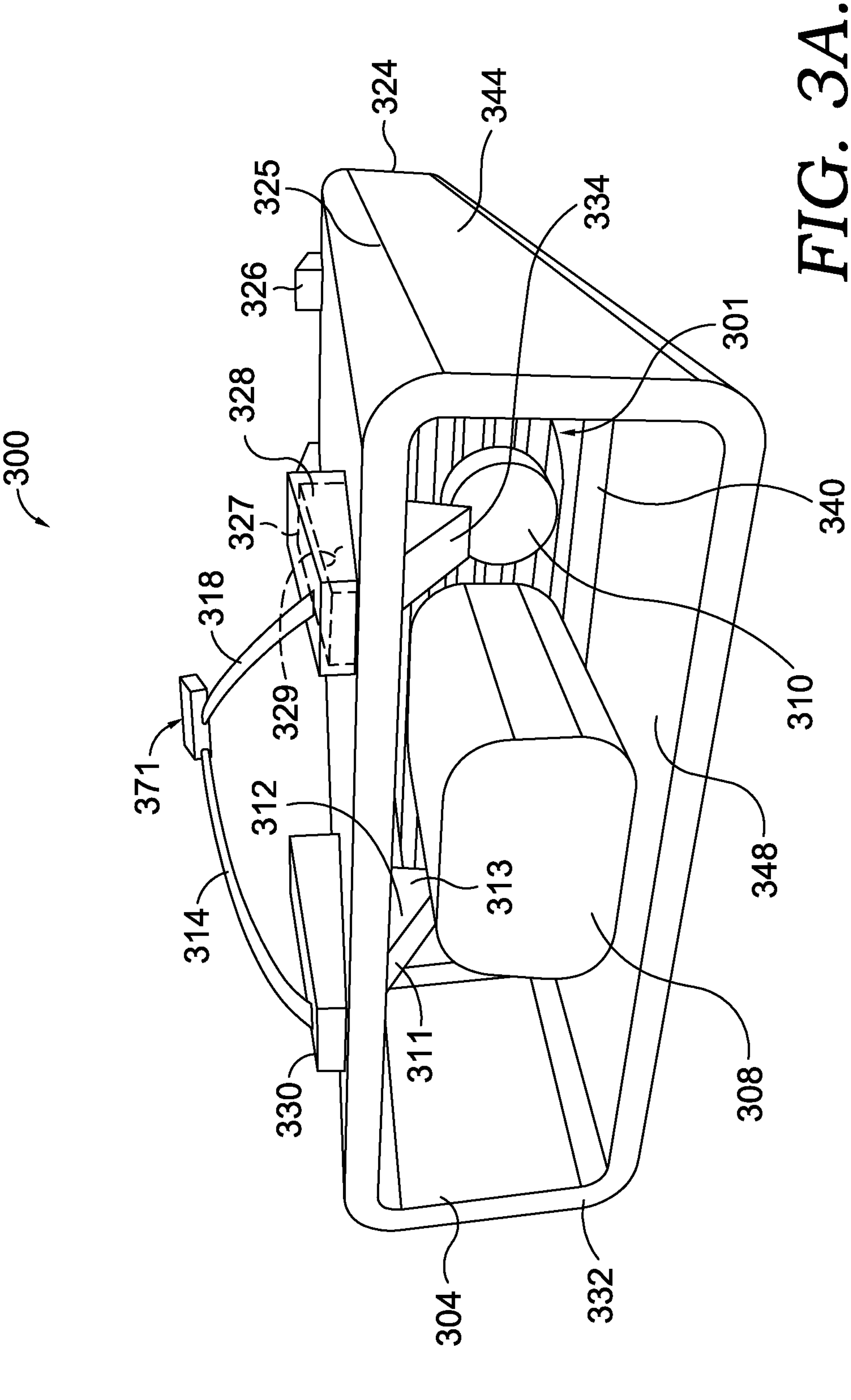
FIGS. 3A and 3B illustrate an example front view of a battery holder, in accordance with an aspect described herein.
Figure 3B:
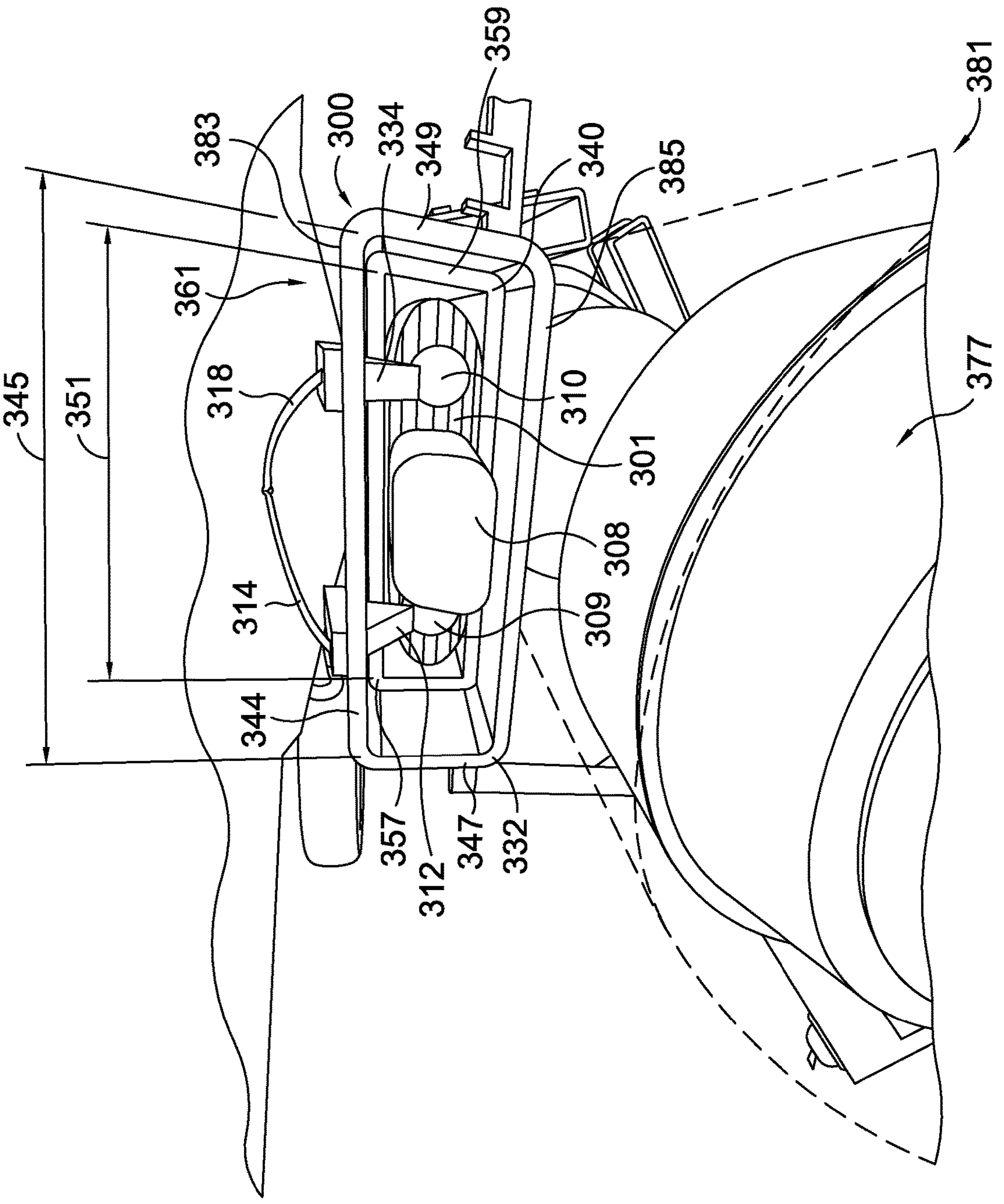

Turning now to FIGS. 3A and 3B, FIGS. 3A and 3B are images depicting the battery holder 300. FIGS. 3A and 3B depict an example front view of the battery holder 300 in accordance with one embodiment. The battery holder 300 can be included in devices such as a UAV. In one example, the battery holder 300 allows the battery 301 to receive and secure a battery inside of the battery holder 300. The battery 301 can fit and be stored inside the battery holder 300. The battery holder 300 has a housing 325 that includes a front end 304 and a rear end 324 with a central longitudinal axis extending therebetween the front end 304 and the rear end 324. For example, the battery holder 300 has a front end 304 with a front end opening and a rear end 324 with a rear end opening and the housing 325 extends between the front end 304 and the rear end 324. The housing 325 includes an inner surface portion 348 and an outer surface portion 344. The housing 325 at least partially defines an opening 332 at the front end 304.

In one embodiment, when the battery 301 is stored inside the battery holder 300, one of more portions of the battery 301 (such as the front bumper 308) may protrude from the inside of the battery holder 300 to a location proximate to the opening 332 of the front end 304. This can allow portions of the battery 301 to couple with any other device near the battery holder 300.

With further reference to FIG. 3A, in one embodiment, the battery holder 300 can include one or more front retainer members 312, 334. The front retainer members 312, 334 comprise a first end 311 and a second end 313. The first end 311 is at a location proximate to the front end 304 of the battery holder 300 than the second end 313. The front retainer members 312, 334 are hingedly coupled to the battery holder 300 at the first end 311. The front retainer members 312, 334 taper away from inner surface portion 348 in a direction extending from the first end 311 toward the second end 313 of the front retainer members 312, 334. The front retainer members 312, 334 can have two or more positions, including a recessed position where the second end 313 is positioned at least partially within the front retainer member receptacles 328, 330 and an extended position where the second end 313 of the front retainer member 312, 334 is extended outward from the inner surface portion 348 of the battery holder 300. In one embodiment, the front retainer members 312, 334 can be spring loaded in order to move the front retainer members 312, 334 from an extended position to a recessed position. For instance, the front retainer members 312, 334 may have a bias toward the extended position. As an example, a spring or other bias member may be disposed within the rear retainer member receptacles 328, 330 to bias the front retainer members 312, 334 toward the extended position. Front retainer member features have been discussed in the plural as described in the features in the examples illustrated. However, other aspects of the technology may comprise a single retainer member feature. Front retainer member receptacles have been discussed in the plural as described in the features in the examples illustrated. However, other aspects of the technology may comprise a single retainer member receptacle feature.

Front retainer member receptacles 328, 330 generally provide a space into which front retainer members 312, 334 may recess. In the example provided by FIG. 3A, the space within the front retainer member receptacles 328, 330 is accessible from openings formed at least partially by the inner surface portion 348. In an aspect, the front retainer member receptacles 328, 330 comprise a perimeter wall 327 extending away from the inner surface portion 348 in a direction from the inner surface portion 348 toward the outer surface portion 344, thereby defining respective chambers 329 of front retainer member receptacles 328, 330 into which front retainer members 312, 334 at least partially recess when in the recessed position. The rear end 324 of the battery holder 300 can also include one or more rear retainer member receptacles 326.

In one embodiment, the front retainer members 312, 334 engage the battery 301 in order to secure the battery inside the battery holder 300. When engaging the battery 301, front retainer members 312, 334 abut battery terminals 309, 310. In the extended position, the front retainer members 312, 334 can secure a battery 301 inside the battery holder 300 when there is a battery inside the battery holder 300. In one example, the front bumper 308 can cause bias against at least one of the front retainer members 312, 334.

In one embodiment, one or more front retainer members 312, 334 can electrically connect to one or more electric connections on a battery 301 using conductive wires 314, 318. The conductive wires 314, 318 can couple to front retainer members 312, 334. One or more conductive wires 314, 318 can connect to the battery 301. In one example, the conductive wires 314, 318 abut to the front retainer members 312, 334. When the front retainer members 312, 334 are coupled to the electrical connections of the battery (for example, in the extended position), the conductive wires 314, 318 can have an electrical connection from the battery 301. In one example, the conductive wires 314, 318 align with the front retainer members 312, 334. Additionally or alternatively, the conductive wires 314, 318 can be located on the rear end of the battery holder 300 as well and can provide electrical connection when the rear retainers couple to the battery 301 terminals of the battery 301.

In one example, the battery holder 300 includes front retainer members 312, 334 located proximate to the front end 304 of the battery holder 300. In an example, the front retainer members 312, 334 are proximate to the front end 304 of the battery holder 300. As an example, the front retainer members 312, 334 may be positioned at a location that is less than about 1 inch (in) (2.54 centimeters (cm)) from the front end 304. The front retainer members 312, 334 are located upwardly and forwardly on the upper portion of the inner surface portion 348 of the battery holder 300 near the opening 332 of the battery holder 300. In one embodiment, one front retainer member 312 is located on one side of the front bumper 308 and another front retainer 334 is located on the opposite side of the front bumper 308 such that when the battery 301 is secured inside the battery holder, each of the front retainer members 312, 334 are located on each side of the front bumper 308. The first front retainer member 312 is spaced apart from the second front retainer member 334. To provide some examples, the first front retainer member 312 is spaced apart from the second front retainer member 334 by a distance of less than about 6 in (15.24 cm), from about less than 3 in (7.62 cm), from about less than 2 in (5.08 cm), or from about less than 1 in (2.54 cm). The first front retainer member 312 is spaced apart from the second front retainer member 334 in a direction perpendicular to the central longitudinal axis. The front retainer members 312, 334 may extend substantially parallel to the central longitudinal axis. The front retainer members 312, 334 have a triangular prism shape (for example, a right angle triangular prism). In one or more alternate embodiments, one or more of the front retainer members 312, 334 may have any other suitable shape such as circular, trapezoidal, rectangular, or even irregularly shape.

In one embodiment, one or more of the front retainer members 312, 334 are spring-loaded to allow it to move from a recessed position to an extended position. That is, a spring or other bias member biases front retainer members 312, 334 toward the extended position. In the recessed position, a portion of the second end 313 can be pressed into its respective front retainer member receptacle 330, 328 such that the front retainer member 312, 334 is pushed along the upper portion of the battery holder 300 to allow a battery to slide in or out of the battery holder 300. In the extended position, a portion of the second end 313 projects towards the central longitudinal axis from the upper portion of the inner surface portion 348 of the battery holder 300.

In one embodiment, the front retainer member 312, 334, in an extended position, abuts (e.g., directly contact) one or more portions of the battery securely held inside the battery holder 300, such as battery terminals 309, 310. In one embodiment, the front retainer member 312, 334 is designed so that an object moving along the longitudinal axis and brushing against the upper portion of the battery holder can push against the front retainer member 312, 334 such that as the object moves from the first end 311 towards the second end 313, the object presses the second end 313 into its respective front retainer member receptacle 330, 328.

In one embodiment, in the extended position, the second end 313 of the front retainer member 312, 334 abuts a portion of the battery 301 in order to secure the battery inside the battery holder 300. When the front retainer member 312, 334 moves from an extended position to a recessed position, it allows the at least one front retainer member 312, 334 to release a battery 301 inside the battery holder 300. It can also allow another object, such as another battery, to slide inside the battery holder 300.

In one embodiment, the front retainer members 312, 334 abut to one or more portions of the battery 301 so that it can electrically connect with one or more positive and negative battery terminals 309, 310 of the battery 301. In one example, the front retainer members 312, 334 are electro-conductive and electro-coupled to conductive wires 314, 318 that can power different portions of the UAV or external devices such as a power distribution board (PDB) of the UAV. In one embodiment, when one or more front retainer members 312, 334 abut the battery 301, the one or more front retainer members 312, 334 are electrically coupled to a portion of the battery 301 so that one or more portions of the UAV, such as the power distribution board, can have an electrical connection from the battery 301 via one or more front retainer members 312, 334 and the conductive wires 314, 318. In one example, one or more of the front retainer members 312, 334 can wirelessly or through a wired connection (such as conductive wires 314, 318) electrically couple to any other portions of the UAV when battery holder 300 is secured to the UAV.

The battery holder 300 includes a rear end 324. The rear end 324 can include one or more rear retainer members secured to the housing 325 of the battery holder 300. It should be understood that the front or rear retainer members can be included anywhere in any portion of the battery holder 300. In one example, one or more of the front or rear retainer members couple with the battery 301 in order to secure the battery 301 inside the battery holder 300. In another example, one or more of the front or rear retainer members allow the battery 301 to snugly fit inside the battery holder 300 that may be advantageous particularly when the UAV 100 (FIG. 1) is in motion. In another example, one or more of the front or rear front retainer members allow the battery 301 to electrically couple with other portions of the UAV 100 or external devices.

Turning to FIG. 3B, the housing 325 of the battery holder 300 has a front end opening frame width 345 located in the front end opening 332 of the housing 325 of battery holder 300. The front end opening frame width 345 located in the front end opening 332 of the housing 325 of the battery holder 300 is defined by two opposite sidewalls 347, 349 of the housing 325. As an example, the front end opening frame width 345 may be about less than about 5 inches (in) (12.7 centimeters (cm)) from one sidewall 347 to the other sidewall 349. It is understood that other width measurements can be implemented for the front end opening frame width 345. The housing 325 of the battery holder 300 has a front end interior frame width 351 located at least partially in an interior portion 340 of the housing 325 of the battery holder 300 and is defined by two interior sidewalls 357, 359 in the interior portion 340 of the housing 325. The front end interior frame width 351 located at least partially in an interior portion 340 of the housing 325 of the battery holder 300 is defined by two interior sidewalls 357, 359 in the interior portion 340 of the housing 325 of the battery holder 300. As an example, the front end interior frame width 351 may be about less than about 4.5 inches (in) (11.43 centimeters (cm)) from one interior sidewall 357 to the other interior sidewall 359. It is understood that other width measurements can be implemented for the front end interior frame width 351. In one embodiment, the front end interior frame width 351 is less than the front end opening frame width 345. As such, the front end opening frame width 345 that is located at the front end opening 332 of the housing 325 of the battery holder 300 is wider than the front end interior frame width 351 partially in an interior portion 340 of the housing 325 of the battery holder 300.

With further reference to FIG. 3B, FIG. 3B illustrates the battery holder 300 attached to the UAV 381. The housing 325 of the battery holder 300 couples different portions of the UAV 381. For example, the upper portion 383 of the housing 325 of the battery holder 300 couples to a PDB 361 of the UAV 381. The conductive wires 314, 318 of the battery holder 300 abut one or more front retainer members 312, 334. The conductive wires 314, 318 couple to a wire connector 371 that mates with a corresponding connector of the UAV 381 to establish an electrical connection to the PDB 361. In one example, an electrical lead couples to one or more front retainer members 312, 334 and extends therefrom to establish an electrical connection with different portions of the UAV 381 such as the PDB 361 of the UAV 381 or any external devices. The front retainer members 312, 334 abut the battery terminals 309, 310 and the front retainer members 312, 334 electrically couple to the battery 301. The conductive wires 314, 318 provide this electrical connection from the front retainer members 312, 334 to other portions of the UAV 381.

With further reference to FIG. 3B, the lower portion 385 of the housing 325 of the battery holder 300 couples to a delivery tube 377. In one example, the delivery tube 377 and other portions of the UAV 381 are arranged such that the front end and the rear end of the battery holder 300 are unobstructed to allow for battery 301 to be removed from the battery holder 300 or inserted into the battery holder 300 while the battery holder 300 is attached to the UAV 381.

Figure 4:
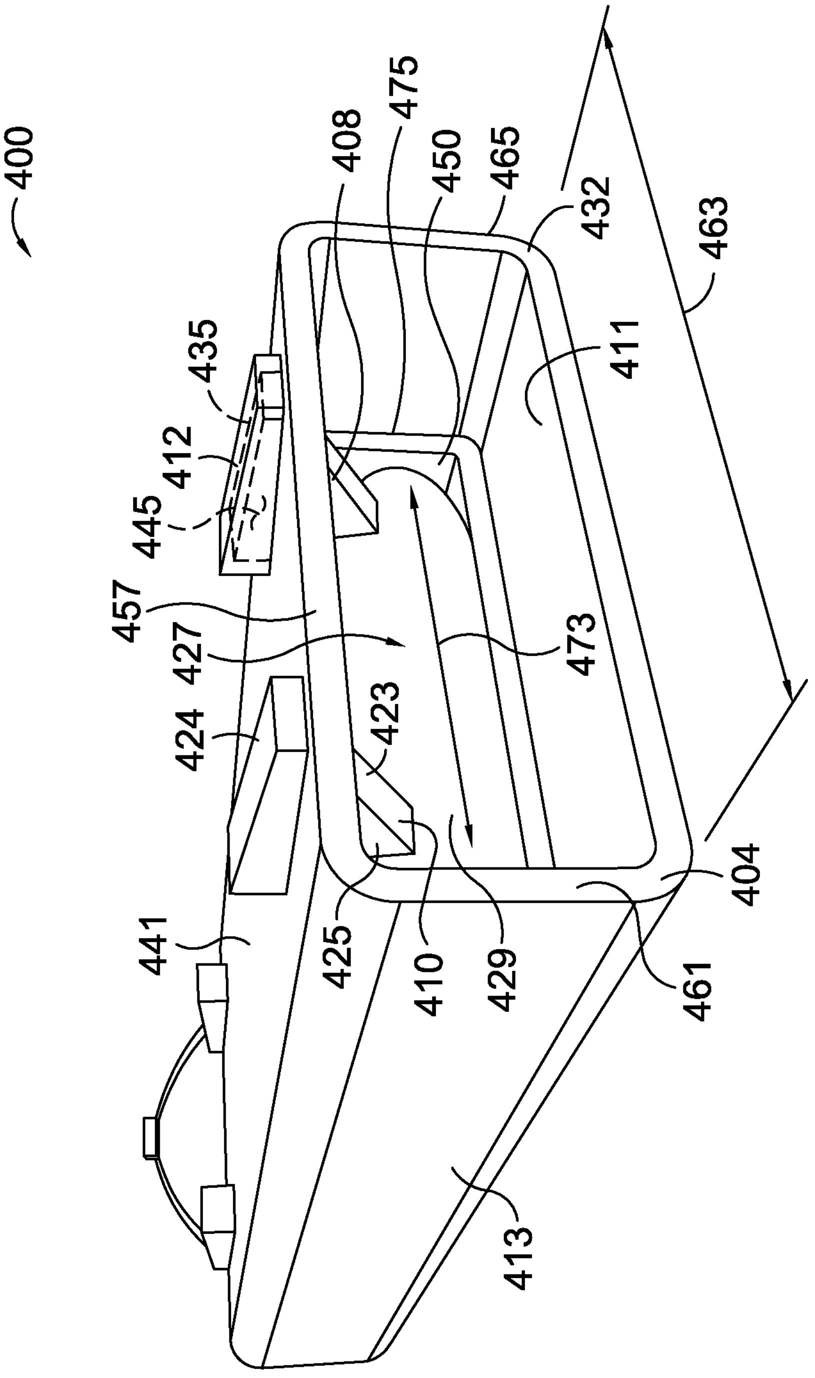
FIG. 4 illustrates a rear view of a battery holder, in accordance with an aspect described herein.

Turning now to FIG. 4, FIG. 4 illustrates the rear view of the battery holder in accordance with one embodiment. Battery holder 400 is an example that is also suitable for use as battery holder 300 of FIG. 3. The housing 413 has a first end 420 and a rear end 404. The housing 413 at least partially defines an opening 432 at the rear end 404.

The rear end 404 of the battery holder 400 includes one or more rear retainer members 408, 410. The rear retainer members 408, 410 comprise a first end 423 and a second end 425. The first end 423 is at a location proximate to the opening 432 of the battery holder 400 than the second end 425. The rear retainer members 408, 410 are hingedly coupled to the battery holder 400 at the first end 423. The rear retainer members 408, 410 taper away from inner surface portion 411 in a direction extending from the first end 423 toward the second end 425 of the rear retainer members 408, 410. Each of the rear retainer members 408, 410 can have two or more positions, including a recessed position where the second end 425 is positioned at least partially within the rear retainer member receptacles 412, 424 and an extended position where the second end 425 of the rear retainer member 408, 410 is extended outward from the inner surface portion 411 towards the central longitudinal axis of the battery holder 400. In one embodiment, the rear retainer members 408, 410 can be spring loaded in order to move the rear retainer members 408, 410 from an extended position to a recessed position. For instance, the rear retainer members 408, 410 may have a bias toward the extended position. As an example, a spring or other bias member may be disposed within the rear retainer member receptacles 412, 424 to bias the rear retainer members 408, 410 toward the extended position. Rear retainer member features have been discussed in the plural as described in the features of the examples illustrated. However, other aspects of the technology may comprise a single retainer member feature. Rear retainer member receptacles have been discussed in the plural described the features in the examples illustrated. However, other aspects of the technology may comprise a single retainer member receptacle feature.

Rear retainer member receptacles 412, 424 generally provide a space into which rear retainer members 408, 410 may recess. In the example provided by FIG. 4, the space within the rear retainer member receptacles 412, 424 is accessible from openings formed at least partially by the inner surface portion 411. In an aspect, the rear retainer member receptacles 412, 424 comprise a perimeter wall 435 extending away from the inner surface portion 411 in a direction from the inner surface portion 411 toward the outer surface portion 441, thereby defining respective chambers 445 of rear retainer member receptacles 412, 424 into which rear retainer members 408, 410 at least partially recess when in the recessed position.

In one embodiment, the rear retainer members 408, 410 engage the battery 427 in order to secure the battery inside the battery holder 400. When engaging the battery 427, rear retainer members 408, 410 abut a rear battery bumper 429 of the battery 427. In the extended position, the rear retainer members 408, 410 can secure a battery 427 inside the battery holder 400 when there is a battery 427 inside the battery holder 400. In one example, the rear battery bumper 429 can cause bias against at least one of the rear retainer members 408, 410.

In one example, the battery holder 400 includes rear retainer members 408, 410 located proximate to the rear end 404 of the battery holder 400. In an example, the rear retainer members 408, 410 are proximate to the rear end 404 of the battery holder 400. As an example, the rear retainer members 408, 410 may be positioned at a location that is less than about 1 inch (in) (2.54 centimeters (cm)) from the rear end 404. The rear retainer members 408, 410 are located upwardly and forwardly on the upper portion of the inner surface portion 411 of the battery holder 400 near the opening 432 of the battery holder 400. In one embodiment, two rear retainer member 408, 410 is located proximate to the battery holder 400. In one example, the first rear retainer member 408 is spaced apart from the second rear retainer member 410. To provide some examples, the first rear retainer member 408 is spaced apart from the second rear retainer member 410 by a distance of less than about 6 in (15.24 cm), from about less than 3 in (7.62 cm), from about less than 2 in (5.08 cm), or from about less than 1 in (2.54 cm). The first rear retainer member 408 is spaced apart from the second rear retainer member 410 in a direction perpendicular to the central longitudinal axis. The rear retainer members 408, 410 may extend substantially parallel to the central longitudinal axis. The rear retainer members 408, 410 have a triangular prism shape (for example, a right angle triangular prism). In one or more alternate embodiments, one or more of the rear retainer members 408, 410 may have any other suitable shape such as circular, trapezoidal, rectangular, or even irregularly shape.

In one embodiment, one or more of the rear retainer members 408, 410 are spring-loaded to allow it to move from a recessed position to an extended position. That is, a spring or other bias member biases rear retainer members 408, 410 toward the extended position. In the recessed position, a portion of the second end 425 can be pressed into its respective rear retainer member receptacle 412, 428 such that one or more rear retainer members 408, 410 are pushed along the upper portion of the battery holder 400 to allow a battery 427 to slide in or out of the battery holder 400. In the extended position, a portion of the second end 425 projects towards the central longitudinal axis from the upper portion of the inner surface portion 411 of the battery holder 400.

In one embodiment, one or more rear retainer members 408, 410, in an extended position, abut (e.g., directly contact) one or more portions of the battery 427 securely held inside the battery holder 400. In one embodiment, the rear retainer members 408, 410 are designed so that an object moving along the longitudinal axis and brushing against the upper portion 457 of the inner surface portion 411 the battery holder 400 can push against the rear retainer member 408, 410 such that a portion of the rear retainer member 408, 410 is pressed into its respective rear retainer member receptacle 412, 424.

In one embodiment, in the extended position, the second end 425 of the rear retainer members 408, 410 abut a portion of the battery 427 in order to secure the battery 427 inside the battery holder 400. For example, the back bumper 429 of the battery 427 can cause bias against at least one rear retainer member 408, 410 in the extended position. When at least one rear retainer member 408, 410 moves from an extended position to a recessed position, it allows the at least one rear retainer member 408, 410 to release a battery 427 inside the battery holder 400. It can also allow another object, such as another battery, to slide inside the battery holder 400.

In one embodiment, the rear retainer members 408, 410 abut the rear bumper 429 of the battery 427, allowing the front retainer members 312, 334 (FIG. 3) to connect securely to the battery terminals 309, 310 (FIG. 3). This can allow the front retainer members 312, 334 (FIG. 3) to couple to the battery terminals 309, 310 (FIG. 3) in order to provide electrical connection from the battery 427. In some embodiments, the rear retainer members 408, 410 can include external connections to electrically couple the battery 427 to portions of the UAV or external devices.

With further reference to FIG. 4, the housing 413 of the battery holder 400 has a rear end opening frame width 463 located in the rear end opening 432 of the housing 413 of battery holder 400. The rear end opening frame width 463 located in the rear end opening 432 of the housing 413 of the battery holder 400 is defined by two opposite sidewalls 461, 465 of the housing 413. As an example, the rear end opening frame width 463 may be about less than about 5 inches (in) (12.7 centimeters (cm)) from one sidewall 461 to the other side wall 465. It is understood that other width measurements can be implemented for the rear end opening frame width 463. The housing 413 of the battery holder 400 has a rear end interior frame width 473 located at least partially in an interior space 450 of the housing 413 of the battery holder 400 and is defined by two interior sidewalls 471, 475 in the inner surface portion 411 of the housing 413. The rear end interior frame width 473 located at least partially in an inner surface portion 411 of the housing 413 of the battery holder 400 is defined by two interior sidewalls 471, 475 in the inner surface portion 411 of the housing of the battery holder 400. As an example, the rear end interior frame width 473 may be about less than about 4.5 inches (in) (11.43 centimeters (cm)) from one interior sidewall 471 to the other interior sidewall 475. It is understood that other width measurements can be implemented for the rear end interior frame width 473. In one embodiment, the rear end interior frame width 473 is less than the rear end opening frame width 463. As such, the rear end opening frame width 463 that is located at the rear end opening 432 of the housing 413 of the battery holder 400 is wider than the rear end interior frame width 473 partially in an inner surface portion 411 of the housing of the battery holder 400.

Figure 5:
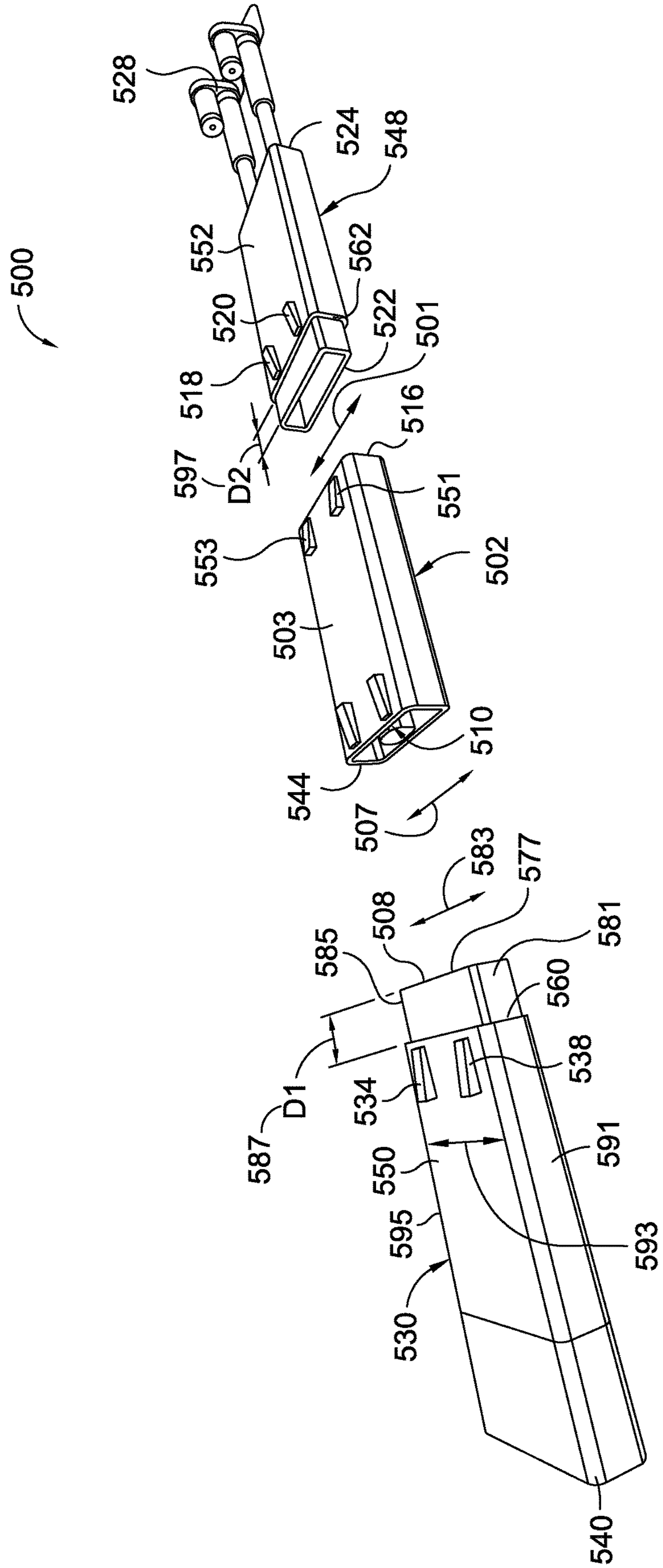
FIG. 5 illustrates an example system to swap a battery, in accordance with an aspect described herein.

Turning to FIG. 5, FIG. 5 illustrates an example system to allow the movement of battery in or out of the battery holder, in accordance with an aspect described herein. Battery holder 300 (FIG. 3) and battery holder 400 (FIG. 4) are examples suitable for use as battery holder 502. The battery holder 502 has a housing 503 that includes a front end 544 and a rear end 516 with a central longitudinal axis extending therebetween the front end 544 and the rear end 516. The housing 503 can include a battery 510 inside. The battery 510 can slide in and out of the battery holder 502 in a longitudinal direction.

The system 500 further includes external devices such as cartridges 530, 548. In one embodiment, the cartridges 530, 548 are separate components. Each of the cartridges 530, 548 have a cartridge housing 550, 552 that includes a tip end 508, 522 and an actuator end 540, 524 spaced apart in the longitudinal direction. An actuator 528 can be coupled to the cartridge 530, 548 in the actuator end 540, 524 of the cartridges 530, 548. The cartridges 530, 548 are designed to store one or more batteries. For example, the cartridges 530, 548 can be designed to store a replacement battery and a spent battery at the same time or a plurality of any combination of batteries. Additionally or alternatively, the cartridges 530, 548 are designed to recharge the one or more batteries.

The cartridges 530, 548 includes cartridge retainer member receptacles 518, 520, 534, 538. The cartridges 530, 548 also include cartridge retainer members. The cartridge retainer members can be pressed into the cartridge retainer member receptacles 518, 520, 534, 538 in a recessed position to allow the movement of a battery in or out of the cartridge 530, 548. The cartridge retainer members of the cartridges 530, 548 moves back into an extended position.

The extended position of the cartridge retainer members allow the cartridge retainer members to secure the battery inside the cartridge 530, 548.

With further reference to FIG. 5, the cartridge housing 550, 552 has a cartridge opening frame width 583 located in the tip end opening 577 of the cartridge housing 550, 552. The cartridge opening frame width 583 located in the tip end opening 577 of the cartridge housing 550, 552 is defined by two opposite sidewalls 581, 585 of the cartridge housing 550. As an example, the cartridge opening frame width 583 may be about less than about 4.5 inches (in) (11.43 centimeters (cm)) from one sidewall 581 to the other side wall 585. It is understood that other width measurements can be implemented for the cartridge opening frame width 583.

The cartridge housings 550, 552 has a cartridge interior width 593 located at a location 560, 562 at least partially distal from the tip end 508, 522 of the cartridge housing 550 and is defined by two opposite sidewalls 591, 595 in an interior portion of the cartridge. As an example, the cartridge interior width 593 may be about less than about 5 inches (in) (12.7 centimeters (cm)) from one sidewall 591 to the other sidewall 595. It is understood that other width measurements can be implemented for the cartridge interior width 593. In one embodiment, the cartridge opening frame width 583 is less than the cartridge interior width 593. As such, the cartridge opening frame width 583 that is located at the tip end opening 508, 522 of the housing 550, 552 is narrower than the cartridge interior width 593 located at location 560, 562 partially distal from the tip end 508, 522 of the cartridge housing 550, 552. The distance from the tip end opening 508, 522 of the cartridges 530, 548 to location 560, 562 where the width changes at location 560, 562 (cartridge interior width 593) is distance D1 587 and distance D2 597. As an example, the distance D1 587 and distance D2 597 may be about less than about 2 inches (in) (5.08 centimeters (cm)) from tip end opening 508, 522 to the location where the width changes at location 560, 562. It is understood that other width measurements can be implemented for distances D1 587 and D2 597 and the measurement of the distances D1 and D2 can be different from each other.

In one embodiment, the cartridge interior width 593 of the cartridge 530, 548 at location 560, 562 is equal to or more than the front end opening frame width 507 of the battery holder 502 or rear end opening frame width 591 of the battery holder 502. The cartridge 530, 548 can partially slide into the battery holder 502 to transfer a battery 510 in or out of the battery holder 502 parallel to the longitudinal axis. Since the cartridge interior width 593 of the cartridge 530, 548 at location 560, 562 is equal to or more than the front end opening frame width 507 of the battery holder 502 or rear end opening frame width 591 of the battery holder 502, the cartridges 530, 548 can slide by a distance D1 587 and distance D2 597 into the battery holder 502.

The cartridges 530, 548 can include actuators 528 that can allow the cartridges 530, 548 to push or guide a replacement battery into the battery holder 502 or push out a spent battery from the battery holder 502. The actuators 528 can push the battery inside the cartridges 530, 548 to allow the battery to slide into the battery holder 502 along a longitudinal direction.

The system 500 allows a spent battery 510 already present inside the battery holder 502 to be swapped for a replacement battery. In another example, the system 500 can also allow for the removal of a battery 510 from the battery holder 502. In another example, the system 500 can allow the insertion of a replacement battery into the battery holder 502. For example, if the battery 510 in the battery holder 502 needs to be recharged or replaced, it can be swapped or removed by this system 500. In another example, if the battery holder 502 does not have a battery 510, the system 500 can insert a replacement battery into the battery holder 502. In one example, the system 500 allows a replacement battery to be inserted into the battery holder 502 from one of a cartridges 530, 548 and allows the spent battery 510 from the battery holder 502 to be expelled into one of the cartridges 530, 548. This can be done in a single move. When the spent battery 510 from the battery holder 502 is ejected into one of the cartridges 530, 548, it can be recharged or replaced. It should be understood that the battery 510 inside the battery holder 502 can be replaced for any reason, for example, the battery 510 inside the battery holder 502 may be old, damaged, spent, uncharged, reduced charge in the battery, different brand, or the like.

Figure 6:
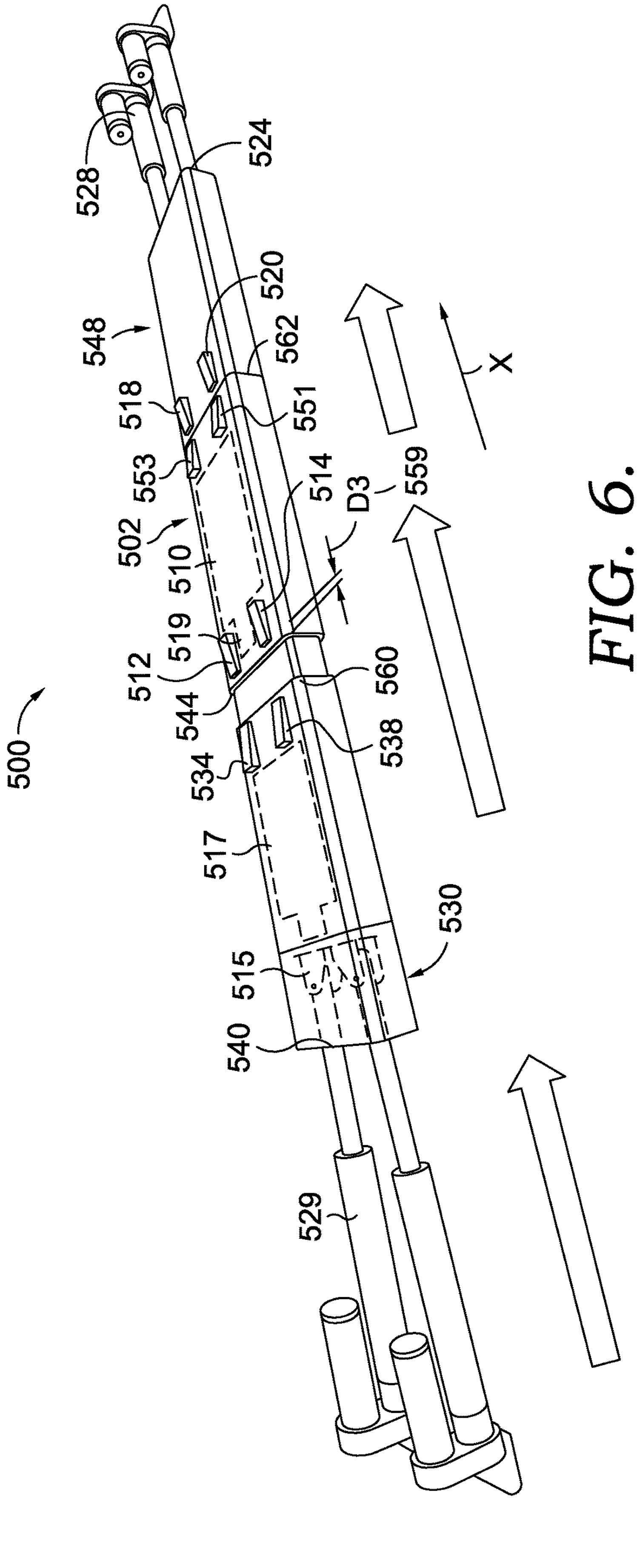
FIGS. 6 and 7 illustrate an example system to swap a battery, in accordance with an aspect described herein.

Turning to FIG. 6, FIG. 6 illustrates the system of FIG. 5 in the process of swapping a battery into the battery holder in accordance with one aspect described herein. In one embodiment, a replacement battery from a first cartridge 530 can be swapped for a spent battery inside the battery holder 502. One of the tip ends 508 of a first cartridge 530 slides into the front end 544 of the battery holder 502 such that the cartridge housing 550 moves along the longitudinal axis. One of the tip ends 522 of a second cartridge 548 slides into the rear end 516 of the battery holder 502 such that the cartridge 548 moves along the longitudinal axis. The longitudinal axis extends along a first direction from the actuator 529 at the actuator end of a first cartridge 530 (in the direction of arrow X) to the actuator 528 at the actuator end of the second cartridge 548 (in the direction of arrow X). The replacement battery is transferred from first cartridge 530 and a spent battery is transferred into the second cartridge 548 (in the direction of arrow X).

The spent battery inside the battery holder 502 can slide in the second cartridge 548 that is empty. This can happen in one move or multiple moves. In one example, a battery can be housed in the first cartridge 530. The battery housed in the first cartridge 530 can be a battery that needs to be inserted into the battery holder 502. In the system 600, the battery inside the battery holder 502 can be swapped for the battery in the first cartridge 530 in a single move. For example, the actuators 529 push the replacement battery from the first cartridge 530 into the battery holder 502 and that movement allows the spent battery in the battery holder 502 to be pushed out into the second cartridge 548.

In one embodiment, to move the batteries inside the first cartridge 530 and/or battery holder 502 in the direction of arrow X, a tip end 522 of the second cartridge 548 slides into the rear end 516 of the battery holder 502 along the longitudinal axis. The second cartridge 548 is slid into the battery holder 502 such that the location 562 (where the width changes to cartridge interior width 593) couples to the rear end opening 516 of the battery holder 502. When the second cartridge 548 is slid around distance D2 597 into the battery holder 502, the tip end 522 of the second cartridge 548 pushes against the rear retainer members of the battery holder 502. This pushes the rear retainer members of the battery holder 502 in a recessed position into the rear retainer member receptacles 551, 553 of the battery holder 502. The rear retainer members of the battery holder 502 in the recessed position do not couple to the battery. When the rear retainer members of the battery holder 502 are in a recessed position, this allows for a spent battery in the battery holder to move in a in the direction of arrow X direction into an empty second cartridge 548.

The tip end 508 of the first cartridge 530 slides into the front end 544 of the battery holder 502 along the longitudinal axis. In one embodiment, the first cartridge 530 slides partially into the battery holder 502 so that the location 560 (where the width of the first cartridge 530 changes to cartridge interior width 593) does not couple to the front end opening 544 of the battery holder 502. The tip end of the first cartridge 530 moves a distance D3 559 inside the battery holder 502 from the front end 544 of the battery holder 502. As such, the distance D3 559 that the first cartridge 530 is slid into the battery holder 502 is less than the distance D1 587 of the first cartridge 530. In one example, first cartridge 530 is slid into the battery holder 502 such that the tip end of the first cartridge is at a location before the location of the front retainer members 512, 514. When the tip end of the first cartridge 530 is at a location before the location of the front retainer members 512, 514, the tip end of the first cartridge 530 won't push against any portion of the front retainer members 512, 514 and move it from an extended position to a recessed position. As such, in one example, D3 559 distance can be any distance from the front end opening 544 of battery holder 502 the first cartridge 530 slides so that the tip end of the first cartridge 530 slides into the battery holder 502 so that the front retainer members 512, 514 remain in an extended position. For example, if the first end of the front retainer members 512, 514 are located at a distance 1 inch inside the battery holder 502 from the front end opening 544 of the battery holder, then the distance D3 559 can be any distance less than 1 inch so that the front retainer members 512, 514 do not go into a recessed position.

In one embodiment, since only a portion of the first cartridge 530 (from tip end 508 of the cartridge 530 to distance D3 559 of the cartridge 530) is slid inside the battery holder 502, the first cartridge 530 does not push the front retainer members of the battery holder 502 into a recessed position. When the first cartridge 530 is inserted a distance D3 559 into the battery holder 502, the front retainer members of the battery holder 502 are in an extended position. This allows a battery (if the battery holder 502 has a battery) to only slide out from in the direction of arrow X since the rear retainer members of the battery holder 502 are in a recessed position allowing a pathway for the battery 510 to move out along the longitudinal axis in the first direction. In another embodiment, the first cartridge 530 slides a distance D3 into the battery holder 502 such that it touches a portion of the front retainer members 512, 514 but it is not enough to completely move the front retainer members 512, 514 into a complete recessed position. A complete recessed position is where a major portion of the front retainer member 512, 514 is recessed into the front retainer receptacles so that the battery inside the battery holder 502 can move out of the battery holder 502.

In one embodiment, the actuator 529 in the actuator end 540 of the first cartridge 530 can be used to push the replacement battery 517 in the first cartridge 530 towards the battery holder 502. This allows the actuator 529 to push the cartridge retainer members in the first cartridge 530 into a recessed position. In one example, the shove end 515 of the actuator 529 is flat in order to push the replacement battery 517. The flat end of the shove end 515 of the actuator 529 also allows the actuator 529 to push against the cartridge retainer members of the first cartridge 530 in order to move the cartridge retainer members from an extended position into a recessed position and into the cartridge retainer member receptacles 534, 538. This allows the replacement battery 517 to slide out of the first cartridge 530 and towards the battery holder 502. The replacement battery 517 slides out of the first cartridge 530 and pushes against the front bumper 519 of the spent battery 510 in the battery holder 502. In another example, the replacement battery 517 pushes against the front retainer members of the battery holder 502 to move them into a recessed position. This allows the replacement battery 517 to slide into the battery holder 502 and the spent battery 510 slides out of the battery holder 502. The spent battery 510 pushes against the cartridge retainer members of the second cartridge 548 causing the cartridge retainer members of the second cartridge 548 to move into a recessed position and enable the spent battery to slide into the second cartridge 548. When the spent battery 510 slides out of the battery holder 502, the second cartridge 548 can retract, which can cause the rear retainer members of the battery holder 502 to move from a recessed position to an extended position. When the rear retainer members of the battery holder 502 are in an extended position, the rear retainer members can secure the replacement battery 517 into the battery holder 502.

In one embodiment, when the shove end 515 of the actuator 529 pushes the replacement battery from the first cartridge 530 into the battery holder 502 and the spent battery 510 from the battery holder 502 into the second cartridge 548, the actuator 529 can cause the cartridge retainer members of the first cartridge 530 to retract into a recessed position. This allows the replacement battery 517 from the first cartridge 530 to slide out of the first cartridge 530, push the front bumper of the spent battery inside the battery holder 502 and push the front retainer members of the battery holder 502 into a recessed position and the spent battery inside the battery holder 502 in turn is pushed into the second cartridge 548. In one example, the batteries 517, 510 can be oriented in any manner (front bumpers facing each other, away from each other or the like) and when the replacement battery 517 is slid into the battery holder 502, the retainer members (either rear or front or both) can couple to the battery terminals of the replacement battery 517 and provide electrical connection to any portion of the UAV.

In one embodiment, when the replacement battery's rear bumper couples to the spent battery's front bumper, the replacement battery 517 pushes the spent battery 510 through the recessed rear retainer members of the battery holder 502 and into the second cartridge 548. In one example, when the spent battery 510 moves out of the battery holder 502 or alternatively past the rear front retainer members of the battery holder 502, the second cartridge 548 can retract slightly or alternatively even completely to allow the rear retainer members of the battery holder 502 to engage with and secure the new replacement battery 517 that has slid in from the front cartridge 530 to replace the spent battery 510.

In one embodiment, the battery swap in the direction of arrow X can happen in one move or in multiple moves. For example, one or more of the second cartridges 548, the battery holder 502, and the first cartridge 530 are aligned along the longitudinal axis, the second cartridge 548 couples to the rear end 516 of the battery holder 502 (sliding distance D2 597 into the battery holder 502), and the first cartridge 530 couples to the front end 544 of the battery holder 502 (sliding a distance D3 587 into the front end 544 of the battery holder 502), and the shove end 515 of the actuator 529 pushes the replacement battery 517 out of the first cartridge 530 that in turn pushes the spent battery 510 from the battery holder 502 into the second cartridge 548. This swap and transfer of batteries can happen in one move. In another embodiment, first the second cartridge 548 couples to the battery holder 502 to release the spent battery from the battery holder 502, then the first cartridge 530 couples to the battery holder 502 and the actuator 529 coupled to the first cartridge 530 then pushes the replacement battery into the battery holder 502. The battery swap in the direction of arrow X can happen in a plurality of moves as well as in any order or any combination.

Figure 7:
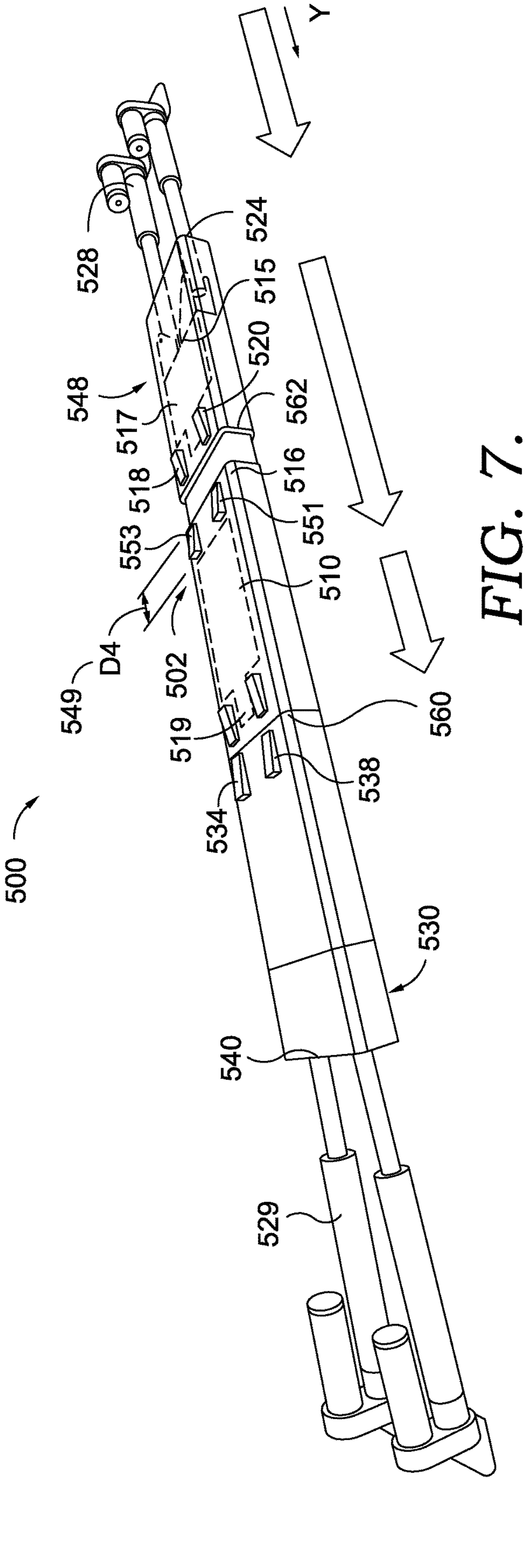

Turning to FIG. 7, FIG. 7 illustrates the system of FIG. 5 in the process of swapping a battery into the battery holder in accordance with one aspect described here in system 500. In one embodiment, a replacement battery from a second cartridge 548 can be swapped for a spent battery inside the battery holder 502. One of the tip ends 508 of a first cartridge 530 slides into the front end 544 of the battery holder 502 such that the first cartridge 530 moves along the longitudinal axis. One of the tip ends 522 of a second cartridge 548 slides into the rear end 516 of the battery holder 502 such that the cartridge 548 moves along the longitudinal axis. The longitudinal axis extends along a first direction from the actuator 529 at the actuator end of a first cartridge 530 to the actuator 528 at the actuator end of the second cartridge 548. The battery is swapped from second cartridge 548 to the first cartridge 530 (in the direction of arrow Y).

The spent battery inside the battery holder 502 can slide in the first cartridge 530 which may be empty or may be capable of holding one or more batteries. In one example, a battery can be housed in the second cartridge 548. The battery housed in the second cartridge 548 can be a replacement battery that can be inserted into the battery holder 502. In the system 500, the battery 510 inside the battery holder 502 can be swapped for the battery in the second cartridge 548 in a single move. For example, the actuators 528 push the replacement battery from the second cartridge 548 into the battery holder 502 and that movement allows the spent battery in the battery holder 502 to be pushed into the first cartridge 530.

In one embodiment, to move the batteries inside the second cartridge 548 and/or the battery holder 502 in the direction of arrow Y, a tip end 508 of the first cartridge 530 slides into the front end 544 of the battery holder 502 along the longitudinal axis. The first cartridge 530 is slid into the battery holder 502 such that the location 560 (where the width changes to cartridge interior width 593) couples to the front end opening 544 of the battery holder 502. When the first cartridge 530 is slid around distance D1 587 from the front end opening 544 of the battery holder 502 into the battery holder 502, the tip end 508 of the first cartridge 530 pushes against the front retainer members of the battery holder 502. This causes the front retainer members of the battery holder 502 to move into a recessed position and into the front retainer member receptacles. The front retainer members of the battery holder 502 in the recessed position do not couple to the battery 510 in the battery holder 502 and that allows a spent battery in the battery holder 502 to move in the direction of the Y arrow into the first cartridge 530.

The tip end 522 of the second cartridge 548 slides into the rear end 516 of the battery holder 502 along the longitudinal axis. In one embodiment, the second cartridge 548 slides partially into the battery holder 502 so that the location 562 (where the width of the second cartridge 548 changes to cartridge interior width 593) does not couple to the rear end opening 516 of the battery holder 502. As such, the distance D4 549 that the first cartridge 548 is slid into the battery holder 502 from the rear end 516 of the battery holder 502 is less than the distance D2 597. Since only a portion of the second cartridge 548 (from the tip end 522 to distance D4 549 of the second cartridge 548) is slid inside the battery holder 502, the second cartridge 548 does not push the rear retainer members of the battery holder 502 into a recessed position. When the second cartridge 548 is inserted a distance D4 549 into the battery holder 502, the rear retainer members of the battery holder 502 remain in an extended position. This allows a battery (if the battery holder 502 has a battery) to only slide out in the direction of the Y arrow since the rear retainer members of the battery holder 502 are in a recessed position and the front retainer members of the battery holder 502 are in an extended position allowing a pathway for the spent battery 510 inside the battery holder 502 to move out along the longitudinal axis in direction of the Y arrow. As an example, the distance D3 559 and D4 548 may be about less than about 1 inches (in) (2.54 centimeters (cm)) from tip end opening 508, 522. It should be understood that distance D3 and D4 can be any other value or can be different values from each other.

In one example, first cartridge 530 is slid into the battery holder 502 such that the tip end of the first cartridge is at a location before the location of the =retainer members 512, 514. When the tip end of the first cartridge 530 is at a location before the location of the front retainer members 512, 514, the tip end of the first cartridge 530 won't push against any portion of the front retainer members 512, 514 and move it from an extended position to a recessed position. As such, in one example, D3 559 distance can be any distance from the front end opening 544 of battery holder 502 the first cartridge 530 slides so that the tip end of the first cartridge 530 slides into the battery holder 502 so that the front retainer members 512, 514 remain in an extended position. For example, if the first end of the front retainer members 512, 514 are located at a distance 1 inch inside the battery holder 502 from the front end opening 544 of the battery holder, then the distance D3 559 can be any distance less than 1 inch so that the front retainer members 512, 514 do not go into a recessed position.

In one embodiment, the actuator 528 in the actuator end of the second cartridge 548 can be used to push the replacement battery in the second cartridge 548 towards the battery holder 502. This allows the actuator 528 to push the cartridge retainer members in the second cartridge 548 into a recessed position. The replacement battery slides out of the second cartridge 548 and pushes against the rear bumper of the spent battery in the battery holder 502. In another example, the replacement battery pushes against the rear retainer members of the battery holder 502 to move them into a recessed position. This allows the replacement battery to slide into the battery holder 502 and the spent battery slides out of the battery holder 502. The spent battery pushes against the cartridge retainer members of the first cartridge 530 into a recessed position allowing the cartridge retainer members of the first cartridge 530 to enable the spent battery to slide into the first cartridge 530. When the spent battery slides out of the battery holder 502, the first cartridge 530 can retract and the first end retainer members of the battery holder 502 move from a recessed position to an extended position. This secures the replacement battery in the battery holder 502.

In one embodiment, when the actuator 528 coupled to the second cartridge 548 pushes the replacement battery from the second cartridge 548 into the first cartridge 530, the actuator 529 coupled to the first cartridge 530 retracts to allow the spent battery from the battery holder 502 to slide into the first cartridge 530.

As such, when the replacement battery's front bumper couples to the rear bumper of the spent battery, the replacement battery pushes the spent battery through the recessed front retainer members of the battery holder 502 and into the first cartridge 530. In one example, when the spent battery moves out of the battery holder 502 or alternatively past the front retainer members of the battery holder 502, the first cartridge 530 retracts slightly or alternatively completely to allow the front retainer members of the battery holder 502 to engage with and secure the replacement battery.

Figure 8A:
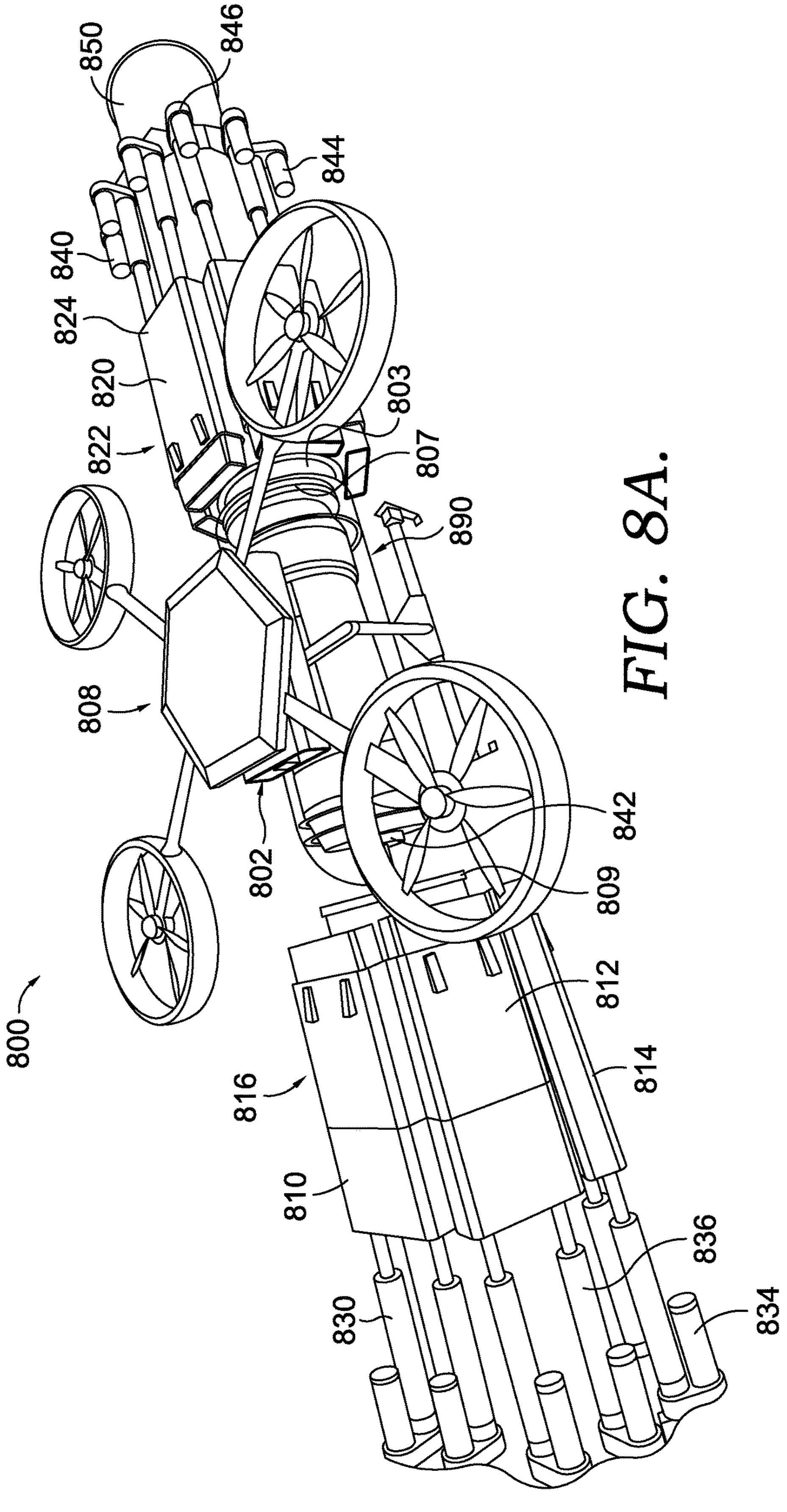
FIGS. 8A, 8B, 8C, and 8D illustrate an example cartridge array to swap batteries, in accordance with an aspect described herein.

Turning now to FIG. 8A, an example embodiment of a cartridge array 800 is depicted, in accordance with an aspect described herein. A battery holder 802 can be coupled or attached to the UAV 808. The battery holder 802 can be attached anywhere or through any devices to the UAV 808. The cartridge array 800 can be used in coordination with a pneumatic delivery system by integrating with a delivery tube 890 as shown in FIGS. 8A-8D. An example pneumatic delivery system comprising a delivery tube 890 with which cartridge array 800 can be used is described in U.S. patent application Ser. No. 17/711,733, filed on Apr. 1, 2022, entitled "Pneumatic Delivery System and Methods for Use with Unmanned Vehicle Systems," the contents of which are hereby expressly incorporated by reference in their entirety.

In one embodiment, the cartridge array 800 includes one or more cartridge packs 816, 822. Each cartridge packs 816, 822 can include one or more cartridges 810, 812, 814, 820 to store one or more batteries. The batteries in the one or more cartridges 810, 812, 814, 820 can be spent batteries, new batteries, uncharged batteries, damaged batteries, charged batteries, not fully charged batteries, different types of batteries or the like. If front end 842 of the delivery tube 890 is of a hemisphere shape extending outwards (convex), then one end 809 of the cartridge pack 816, 822 can be concave in shape so that the hemispheric convex shape of the front end 842 of the delivery tube 890 can couple to the cartridge pack 816, 822. If the rear end 807 of the delivery tube 890 is flat, then one end 803 of the cartridge pack 816, 822 can be flat in shape so that the rear end 807 of the delivery tube 890 can couple to the cartridge pack 816, 822.

With further reference to FIG. 8A, in one embodiment, the cartridge pack 816, 822 can rotate to align a preferred cartridge 810, 812, 814, 820 with one of the front end or rear end of the battery holder 802. For example, if the battery holder 802 takes a specific kind of battery, the cartridge packs 816, 822 will rotate to locate a cartridge that includes that battery in any one of the cartridge packs 816, 822. In another example, if a spent battery from the battery holder 802 needs to be transferred into one of the cartridges 810, 812, 814, 820, the cartridge packs 816, 822 on the side where the battery will be pushed out from, one of the cartridge packs 816, 822 can determine where the empty cartridge is located and can rotate the cartridge packs 816, 822 to align the empty cartridge to receive the spent battery from the battery holder 802.

Figure 8B:
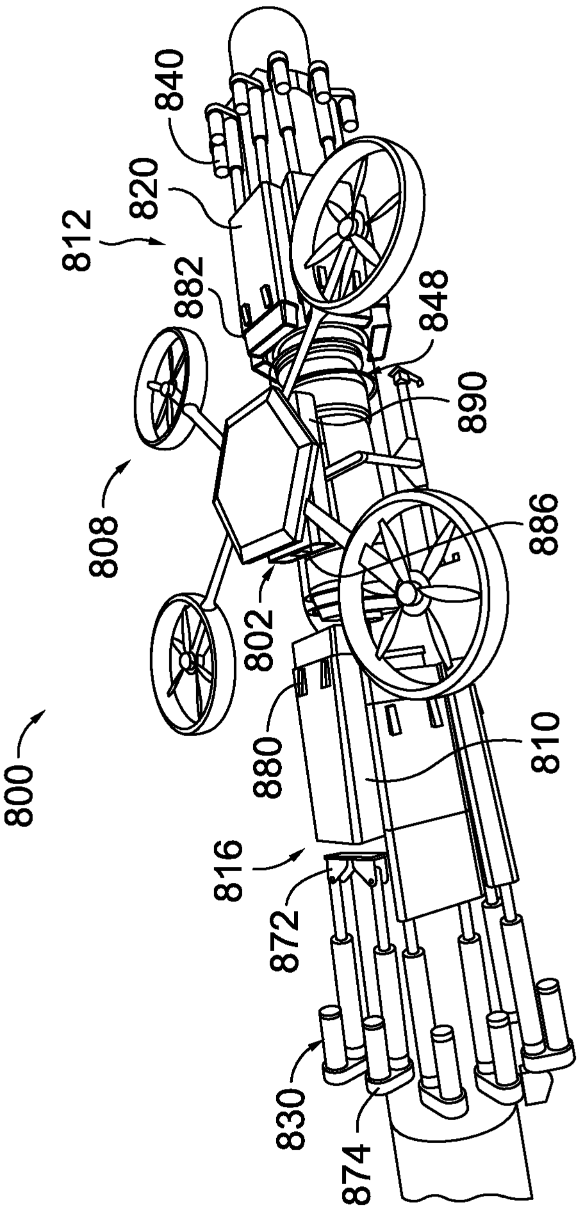

The cartridge packs 816, 822 can include any number of the cartridges 810, 812, 814, 820 and can be designed in any manner to align the required cartridge 810, 812, 814, 820 on any side of the battery holder 802. The cartridge packs 816, 822 can be twin rotating cartridge packs or any shape of cartridge packs. In one example, on one side of the cartridge pair, cartridges 810, 812, 814, 820 having replacement batteries are rotated to align with one of the ends (front end or rear end) of the battery holder 802, and on the opposite end of the battery holder 802, a cartridge 810, 812, 814, 820 is aligned that can receive the spent battery from the battery holder 802. The actuator end of the one or more cartridges 810, 812, 814, 820 can include one or more actuators 830, 836, 834, 840, 844, 846. The actuators 830, 836, 834, 840, 844, 846 are designed to push or guide the batteries into the battery holder or push or guide the retainers holding the batteries in the battery holders or allow the batteries in the battery holder to be transferred to other devices such as a cartridge 810, 812, 814, 820. The actuators 830, 836, 834, 840, 844, 846 can also be designed to move the retainers in the cartridges from an extended position into a recessed position when transferring a battery from the cartridge 810, 812, 814, 820 into the battery holder 802. Turning now to FIG. 8B, another example embodiment of a cartridge array 800 is depicted, in accordance with an aspect described herein. The cartridge packs 816, 822 align so that the cartridge packs 816, 822 and the battery holder-UAV-delivery tube combination 802, 808, 890 are along the longitudinal axis in a first direction (extending in the direction from the front end 886 of the battery holder 802 and the rear end of the battery holder 802). In one example, the cartridge packs 816, 822 are connected to external devices such as motors that are configured to control the cartridge packs 816, 822. In one example, a motor can be attached to the ends 850 of the cartridge packs 816, 822 that can be used to rotate the cartridge packs 816, 822 to align an identified cartridge to the battery holder 802 or even to push an actuator 830, 836, 834, 840, 844, 846 (for example when a battery needs to be exchanged).

The cartridges 816, 820 align to be in the same longitudinal axis from the battery holder 802 to transfer a replacement battery from one of the cartridges 810, 820 into the battery holder and/or transfer a spend battery from the battery holder 802 into one of the cartridges 810, 820.

With further reference to FIG. 8B, the actuator 830, 840 has a shove end 872 and a rear end 874 spaced apart along the longitudinal axis. The shove end 872 of the actuator 830, 840 is flat and is configured to push the front bumper or rear bumper of the replacement battery into the battery holder 802. The shove end 872 of the actuator 830, 840 also contains protrusions to push the retainer mechanisms of the cartridge 810, 820 into a recessed position in order to release the replacement battery in the cartridge 810, 820 and allow the replacement battery to be pushed into the battery holder 802.

The middle portion of the actuator 830, 840 includes one or more tubular shaped pistons that can be used to extend or elongate to push the replacement battery into the battery holder 802 or contract to guide the spent battery into the cartridge 810, 820. When the actuator 830, 840 is elongated, the shove end 872 of the actuator 830, 840 can move inside the cartridge 810, 820 from a location at the distal end of the rear end of the cartridge a location close to the area 880, 882 where the width of the cartridge changes. When the actuator 830, 840 contracts, a portion of the actuator 830, 840 retracts into the rear end 874 of the actuator 830, 840. This can allow for a battery to be stored inside the cartridge 810, 820.

Figure 8C:
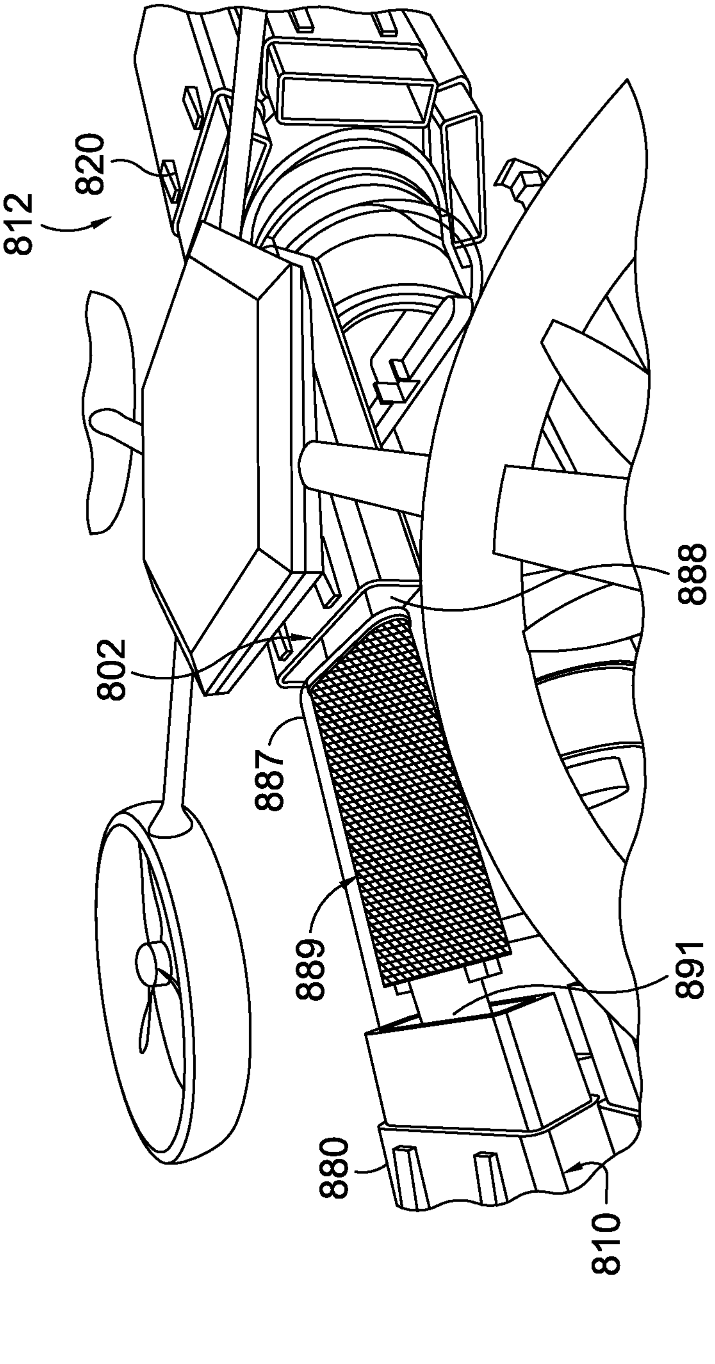

Turning now to FIG. 8C, an example method of a battery movement is depicted, in accordance with an aspect described herein. In one embodiment, when the replacement battery 889 is being transferred from one cartridge 810 into the battery holder, an actuator associated to the cartridge 810 pushes the replacement battery 889 or the front bumper 891 of the replacement battery 889. The rear bumper 887 of the replacement battery 889 pushes against the front bumper 891 of the spent battery 888. This allows the replacement battery 889 to move into the battery holder 802 and push the spent battery 888 out of the battery holder 802.

While FIG. 8C does not depict that the tip end of the cartridge 810 couples to the front end of the battery holder 802, but in some embodiments, the tip end of the cartridge 810 couples to the front end of the battery holder 802. In some embodiments, only a portion of the tip end of the cartridge 810 couples to the front end of the battery holder 802.

Figure 8D:
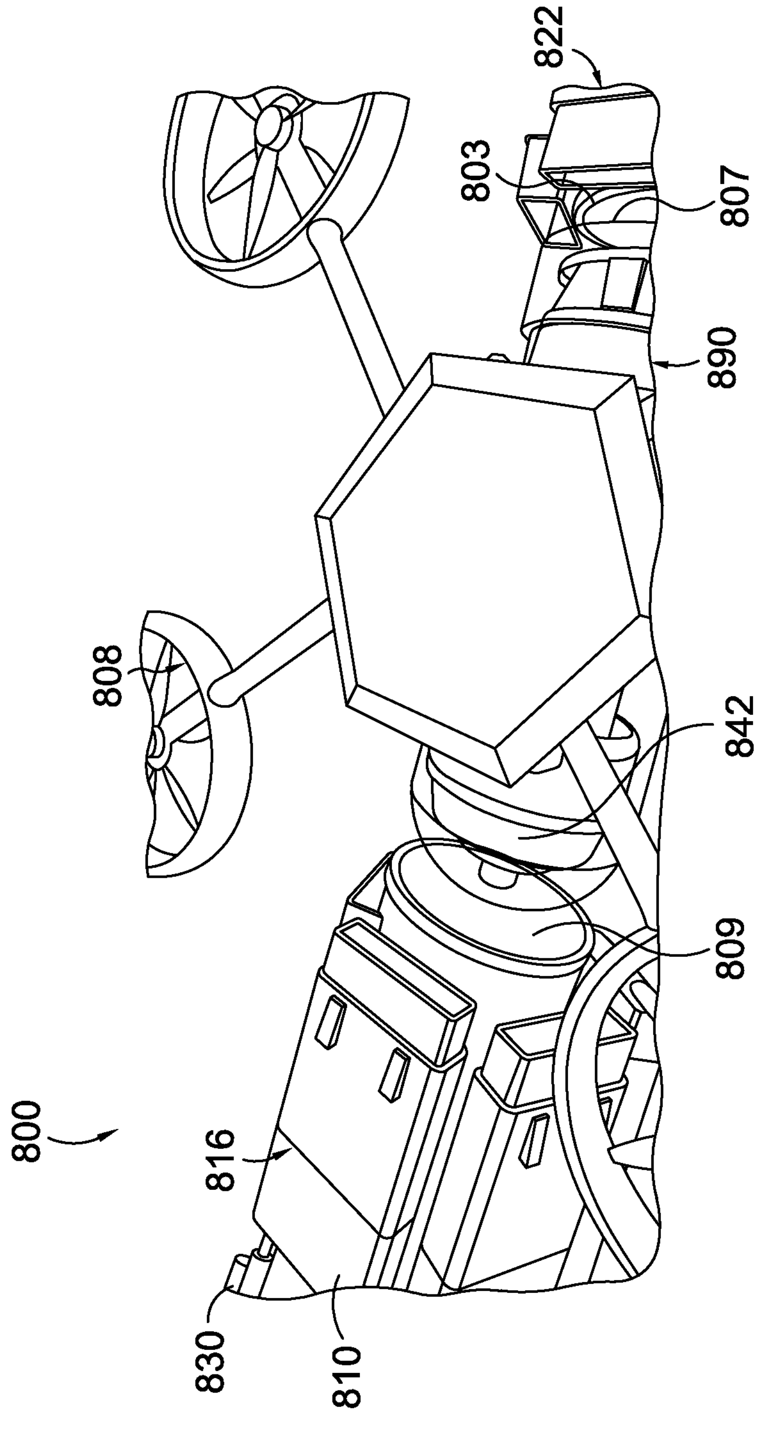

Turning now to FIG. 8D, another example embodiment of a cartridge array 800 is depicted, in accordance with an aspect described herein. One of the cartridge packs 816 is designed such that when the cartridge pack 816 couples to a delivery tube 890 being carried by the UAV 808. If front end 842 of the delivery tube 890 is of a hemisphere shape extending outwards (convex), then one end 809 of the cartridge pack 816, 822 can be concave in shape so that the hemispheric convex shape of the front end 842 of the delivery tube 890 can couple to the cartridge pack 816, 822. If the rear end 807 of the delivery tube 890 is flat, then one end 803 of the cartridge pack 816, 822 can be flat in shape so that the rear end 807 of the delivery tube 890 can couple to the cartridge pack 816, 822. This can allow the cartridge packs to couple to the battery holder-UAV-delivery tube package 802, 808, 890 and align so that batteries can be transferred to and from the cartridges and battery holder 802.

Figure 9:
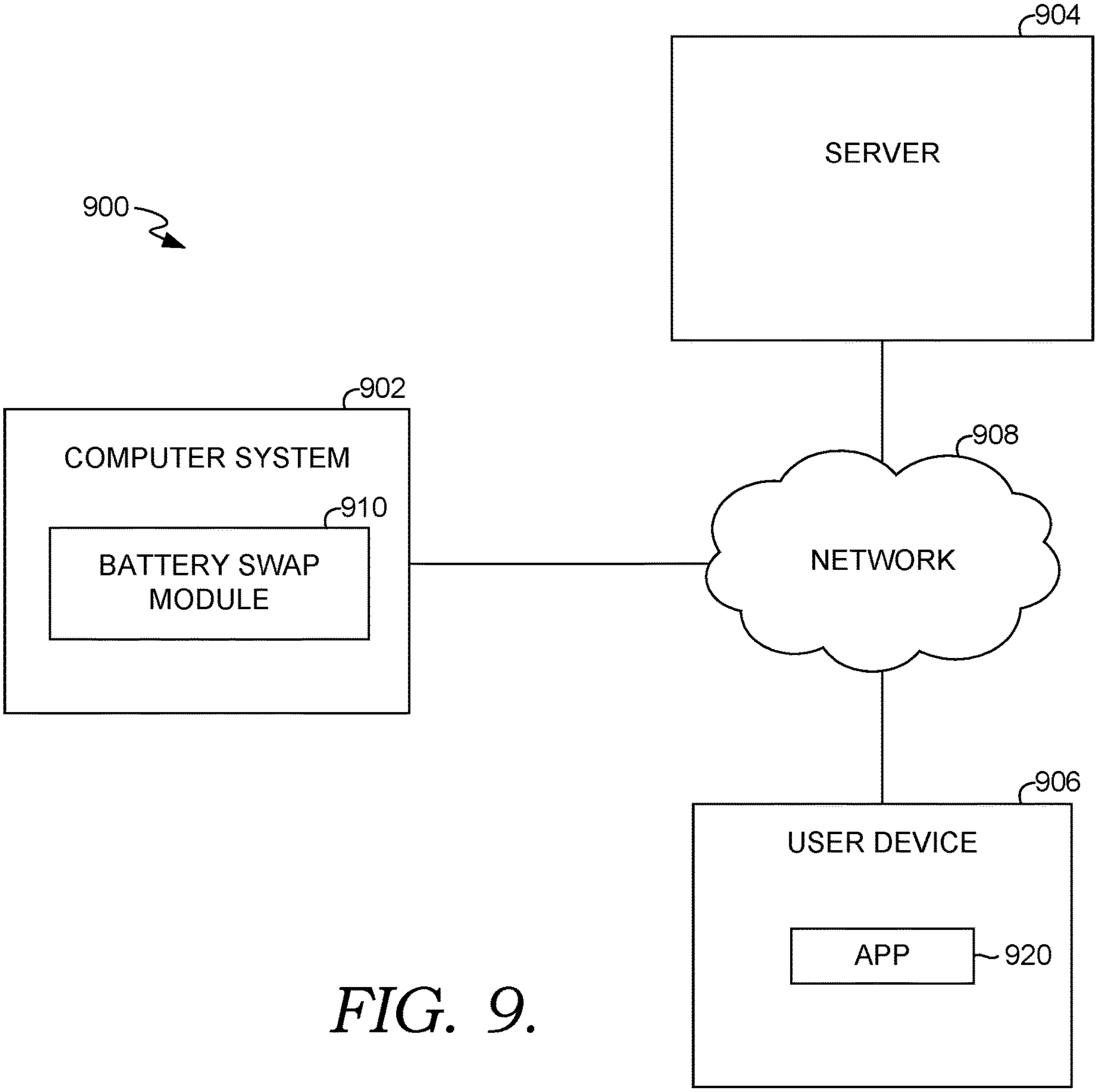
FIG. 9 is a diagram of an environment that can be used to perform the method to swap a battery, according to embodiments of the present disclosure.

Turning to FIG. 9, FIG. 9 is a diagram of an environment 900 that can be used to perform the battery swap method, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

Environment 900 is an example of a suitable architecture for implementing certain aspects of the present disclosure. In one embodiment, environment 900 includes, among other components not shown, a battery swap system 902, and a user device 906. Each of the battery swap system 902 and user device 906 shown in FIG. 9 can comprise one or more computer devices, such as the computing device 1100 of FIG. 11 discussed below. The battery swap system 902 may be embodied at least partially by the instructions corresponding to application 920. Therefore, the battery swap system 902 can operate on a server or on a user device, such as user device 906, or partially on multiple devices. As shown in FIG. 9, the battery swap system 902 and the user device 906 can communicate via a network 908, which may include, without limitation, one or more local area networks (LANs) and/or wide area networks (WANs). Such networking environments are commonplace in offices, enterprise-wide computer networks, intranets, and the Internet. It should be understood that any number of user devices and in-building coverage analytics systems may be employed within environment 900 within the scope of the present disclosure. Each may comprise a single device or multiple devices cooperating in a distributed environment. For instance, the battery swap system 902 could be provided by multiple devices collectively providing the functionality of the battery swap system 902 as described herein. Additionally, other components not shown may also be included within the network environment.

It should be understood that any number of user devices 906, battery swap systems 902, and other components can be employed within the operating environment 900 within the scope of the present disclosure. Each can comprise a single device or multiple devices cooperating in a distributed environment.

User device 906 can be any type of computing device capable of being operated by a user. For example, in some implementations, user device 906 is the type of computing device described in relation to FIG. 11. By way of example and not limitation, a user device 906 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 906 can include one or more processors, and one or more computer-readable media. The computer-readable media may include computer-readable instructions executable by one or more processors. The instructions may be embodied by one or more applications, such as application 920 shown in FIG. 9. Application 920 is referred to as a single application for simplicity, but its functionality can be embodied by one or more applications in practice. As indicated above, the other user devices can include one or more applications similar to application 920.

The application(s) may generally be any application capable of facilitating movement of the battery (e.g., via the exchange of information between the user devices and the battery swap system 902). In some implementations, the application(s) comprises a web application, which can run in a web browser, and could be hosted at least partially on the server-side of environment 900. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 920 can initiate the battery swap system 902 to facilitate battery swap method via a set of operations.

In embodiments, the battery swap system 902 obtains instructions to transfer a battery either to the battery holder to from the battery holder or both. In one example, the battery swap system 902 determines the cartridge that includes the battery that needs to be transferred into the battery holder. In another example, the battery swap system 902 also determines a cartridge that is empty to which the battery in the battery holder can be transferred from. The battery swap system 902 moves the cartridges to couple to one or more ends of the battery holder. For example, the cartridge that will be providing a battery to the battery holder will be moved to couple to the front end of the battery holder and the cartridge that will be receiving the spent battery from the battery holder will couple to the rear end of the battery holder. In another example, one cartridge pack will rotate the cartridge that will be providing a battery to the battery holder to couple to the front end of the battery holder and another cartridge pack will rotate the cartridge that will be receiving the spent battery from the battery holder will couple to the rear end of the battery holder. The battery swap system 902 will determine which actuators to move in order to initiate transfer. For example, if the instructions were to only remove a battery from the battery holder, the battery swap system 902 will use an actuator to either push the spent battery out of the battery holder or use the actuator to move the retainers of the battery holder holding the spent battery in place inside the battery holder and guide the spend battery into an empty cartridge coupled to the rear end of the battery holder.

For cloud-based implementations, the instructions on battery swap system 902 may implement one or more aspects of the battery swap system 902, and application 920 may be utilized by a user and/or system to interface with the functionality implemented on server(s). In some cases, application 920 comprises a web browser. In other cases, battery swap system 902 may not be required. For example, the functionality described in relation to the battery swap system 902 can be implemented completely on a user device, such as user device 906.

These components may be in addition to other components that provide additional functions beyond the features described herein. The battery swap system 902 can be implemented using one or more devices, one or more platforms with corresponding application programming interfaces, cloud infrastructure, and the like. While the battery swap system 902 is shown separate from the user device 906 in the configuration of FIG. 9, it should be understood that in other configurations, some or all of the functions of the battery swap system 902 can be provided on the user device 906.

Figure 10:
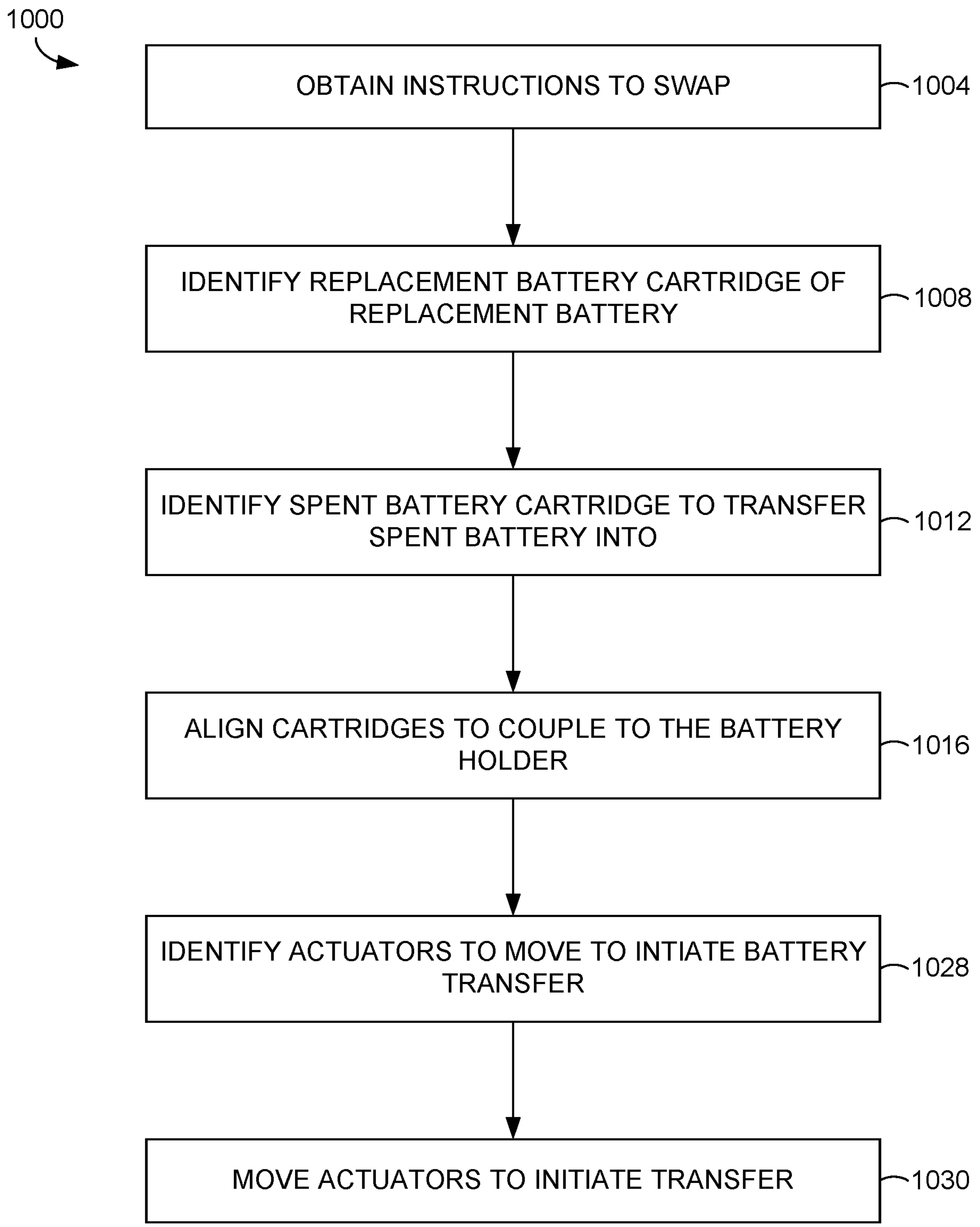
FIG. 10 is a flow diagram illustrating an example method for moving batteries in accordance with one embodiment of the present disclosure.

With reference to FIG. 10. FIG. 10 is a flow diagram illustrating an example method 1000 for facilitating a battery swap in accordance with one embodiment of the present disclosure. FIG. 10 provides images illustrative of aspects described herein. A processing device such as a user device, a server, a cloud computing service or the like implements the example method 1000. The battery swap system 902 (FIG. 9) can initiate the battery swap method 1000 as described herein.

As shown in FIG. 10, in one embodiment, at block 1004, a battery swap system obtains instructions to swap a battery. The instructions can be to transfer a battery either to the battery holder or out of the battery holder or both. At block 1008, the battery swap system identifies a replacement battery cartridge that includes a replacement battery that needs to be transferred into the battery holder. At block 1012, the battery swap system also identifies a spent battery cartridge that can be empty and in which the spent battery in the battery holder can be transferred into.

With further reference to FIG. 10, at block 1016, the battery swap system aligns the cartridges to couple to one or more ends of the battery holder. For example, the cartridge that will be providing a replacement battery to the battery holder will be moved to couple to the rear end of the battery holder and the cartridge that will be receiving the spent battery from the battery holder will couple to the front end of the battery holder. In another example, one cartridge pack will rotate the cartridge that will be providing a replacement battery to the battery holder to couple to the front end of the battery holder and another cartridge pack will rotate the cartridge that will be receiving the spent battery from the battery holder to couple to the rear end of the battery holder.

With further reference to FIG. 10, at block 1028, the battery swap system will identify the actuators that will be used to initiate transfer of the battery. For example, if the instructions were to only remove a battery from the battery holder, the battery swap system will use an actuator to either push the spent battery out of the battery holder or use the actuator (block 1030) to move the retainers of the battery holder holding the spent battery in place inside the battery holder and guide the spent battery into an empty cartridge coupled to the rear end of the battery holder. In another example, if the instructions were to swap a battery, the battery swap system 902 (FIG. 9) will use an actuator to push the replacement battery from the cartridge coupled to the front end of the battery holder that will in turn push the spent battery from inside the battery holder and transfer it into a cartridge coupled to the rear end of the battery holder.

Figure 11:
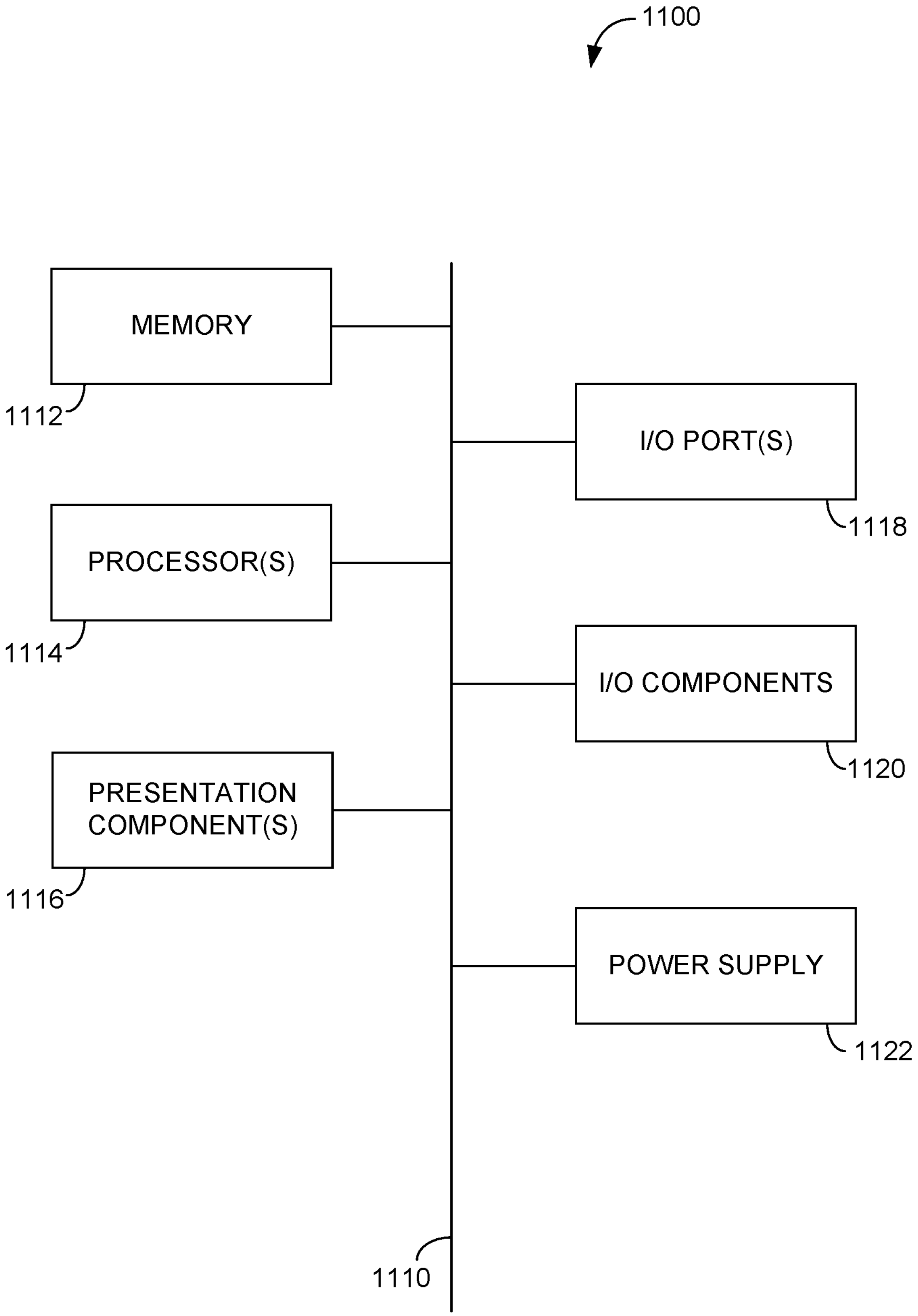
FIG. 11 is an example operating environment for implementing embodiments of the present technology.

Having described implementations of the present disclosure, an example operating environment in which embodiments of the present technology may be implemented is described below in order to provide a general context for various aspects of the present disclosure. Referring to FIG. 11, an example operating environment for implementing embodiments of the present technology is shown and designated generally as computing device 1100. Computing device 1100 is but one example of a suitable computing environment and is not intended to suggest any limitation as to the scope of use or functionality of the technology described herein. Neither should the computing device 1100 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more buses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, and removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport member and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Example hardware devices include solid-state memory, hard drives, optical-disc drives, etc. Computing device 1100 includes one or more processors that read data from various entities such as memory 1112 or I/O components 1120. Presentation component(s) 1116 present data indications to a user and/or system or other device. Example presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user and/or system interface (NUI) that processes air gestures, voice, or other physiological inputs generated by a user and/or system. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1100. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope. Advantageously, these and other embodiments, as described herein, improve the way UAVs or devices within the UAVs or containers or delivery tubes within the UAVs operate in terms of computer resource consumption (e.g., power, CPU, memory, I/O, network latency) and efficiency.

Embodiments described above may be combined with one or more of the specifically described alternatives. In particular, an embodiment that is claimed may contain a reference, in the alternative, to more than one other embodiments. The embodiment that is claimed may specify a further limitation of the subject matter claimed.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely example. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Accordingly, described herein are various aspects of technology directed to systems for delivery tube with power supply for UAVs. It is understood that various features, sub-combinations, and modifications of the embodiments described herein are of utility and may be employed in other embodiments without reference to other features or sub-combinations. Moreover, the order and sequences of steps shown in the example flow diagrams are not meant to limit the scope of the present disclosure in any way, and in fact, the steps may occur in a variety of different sequences within embodiments hereof. Such variations and combinations thereof are also contemplated to be within the scope of embodiments of this disclosure.

Some example aspects of the technology that can be practiced from the foregoing description include the following:

Aspect 1: A system for swapping one or more batteries, the system comprising a battery holder configured to store a first battery, wherein the battery holder further includes retainers positioned proximate a front end and a rear end of the battery holder, the retainers having a first position and a second position such that the retainers, in the first position, are configured to engage the first battery in order to dispose the first battery in a storage position in the battery holder and, in the second position, are configured to disengage from the first battery to allow the first battery to move from the storage position; and one or more cartridges having a front end and a rear end configured to couple to at least one of the front end and the rear end of the battery holder and further configured to hold a second battery in the second enclosure, wherein when the one or more cartridges is decoupled from the battery holder, a retainer of the battery holder is in the first position, and wherein when the one or more cartridges is coupled to the battery holder, the retainer of the battery holder is in the second position.

Aspect 2: Aspect 1, wherein the retainers comprise an electrically conductive material, and the retainers are positioned within the battery holder to engage terminals of the battery in the storage position.

Aspect 3: Any of the Aspects 1-2, further comprising one or more electrical leads coupled to the retainers.

Aspect 4: Any of the Aspects 1-3, wherein the one or more cartridges comprise: a tip end having an opening including two opposite sidewalls in the opening; and an interior portion distal to the actuator end including two opposite sidewalls in the interior portion, wherein a cartridge opening frame width between the two sidewalls in the opening is less than a cartridge interior width between the two sidewalls in the interior portion.

Aspect 5: Any of the Aspects 1-4, wherein the one or more cartridges receive the first battery from the battery holder into the one or more cartridges.

Aspect 6: Any of the Aspects 1-5, wherein each of the one or more cartridges includes an actuator configured to push the second battery into the battery holder.

Aspect 7: Any of the Aspects 1-6, wherein the actuator is configured to guide the first battery into the second enclosure of the one or more cartridges.

Aspect 8: Any of the Aspects 1-7, further comprising a first cartridge of the one or more cartridges such that the front end of the first cartridge couples to the front end of the battery holder; and a second cartridge of the one or more cartridges such that the front end of the second cartridge couples to the rear end of the battery holder and the rear end of the second cartridge comprises an actuator configured to push through at least a portion of the second cartridge in a direction from the rear end of the second cartridge toward the front end of the second cartridge.

Aspect 9: Any of the Aspects 1-8, further comprising a cartridge array including one or more cartridges, the cartridge array configured to move any one of the one or more cartridges in the cartridge array to align and couple with at least one of the front end and rear end of the battery holder.

Aspect 10: A battery holder comprising: a housing comprising: a front end having a front end opening; a rear end having a rear end opening, the housing extending between the front end and the rear end in a longitudinal direction; an inner surface that defines an interior space; and one or more retainer member receptacles, each retainer member receptacle comprising a perimeter wall extending away from the inner surface and defining a chamber; one or more retainer members, each of the one or more retainer members comprising a first end and a second end, and configured to move between a first position and a second position, wherein in the first position, the one or more retainer members taper outward and away from the interior portion in the longitudinal direction from the first end to the second end, and wherein in the second position, the one or more retainer members are at least partially recessed within respective chambers of the one or more retainer member receptacles, the one or more retainer members comprising an electrically conductive material; and one or more electrical leads coupled to the electrically conductive material of the one or more retainer members and extending therefrom.

Aspect 11: Aspect 10, wherein each of the one or more retainer members are hingedly coupled to the battery holder at the first end of the retainer member.

Aspect 12: Any of the Aspects 10-11, wherein, in the first position, the one or more retainers are configured to electrically couple with battery terminals of a battery when stored in the interior space of the battery housing.

Aspect 13: Any of the Aspects 10-12, wherein the one or more retainer members are biased toward the first position.

Aspect 14: Any of the Aspects 10-13, wherein each of the one or more retainer members are spring loaded to permit the one or more retainer members to move between the first position and the second position.

Aspect 15: Any of the Aspects 10-14, wherein the first end of the one or more retainer members located proximate to the front end of the battery holder are proximate to the front end opening of the battery holder and the first end of the one or more retainer members located proximate to the rear end of the battery holder are proximate to the rear end opening of the battery holder.

Aspect 16: Any of the Aspects 10-15, wherein two retainer members are located proximate the front end of the battery holder and arranged to align with battery terminals of a battery.

Aspect 17: A method to swap one or more batteries, the method comprising: aligning a first cartridge to couple to a battery holder, the battery holder comprising: a first housing storing a first battery, the first housing extending longitudinally between a front end and a rear end and having an inner surface that defines an interior space; retainer member receptacles, each retainer member receptacle comprising a perimeter wall extending away from the inner surface and defining a chamber; a front retainer member proximate the front end and a rear retainer member proximate the rear end of the first housing, each of the front retainer member and the rear retainer member comprising a first end and a second end, and configured to move between a first position and a second position, wherein in the first position, each of the front retainer member and the rear retainer member taper outward and away from the interior portion in the longitudinal direction from the first end to the second end, and wherein in the second position, each of the front retainer member and the rear retainer member is at least partially recessed within respective chambers of retainer member receptacles; and coupling the first cartridge to the battery holder such that a portion of the first cartridge engages the front retainer member and moves it from the first position the second position; and from a second cartridge comprising a second housing storing a second battery, pushing the second battery into the first housing at the rear end, the second battery engaging the rear retainer member and moving it from the first position to the second position, wherein pushing the second battery into the first housing moves the first battery into the first cartridge.

Aspect 18: Aspect 17, further comprising: pushing an actuator inside the second cartridge, the actuator coupled to the rear end of the second cartridge, wherein pushing the actuator pushes the second battery towards the battery holder.

Aspect 19: Any of the Aspects 17-18, further comprising decoupling the first cartridge from the battery holder, thereby causing the front retainer member to move to the first position, wherein in the first position, the front retainer member engages a battery terminal of the second battery.

Aspect 20: Any of the Aspects 17-19, wherein the front retainer member comprises an electrically conductive material, and engagement with the battery terminal establishes an electrical connection between the battery and the front retainer member.

What is claimed is:

1. A system comprising:

a battery holder configured to store a first battery, wherein the battery holder further includes a retainer member positioned proximate a front end and a rear end of the battery holder, the retainer member comprising a first retainer end and a second retainer end, and configured to move between a first position and a second position such that the retainer member, in the first position, is configured to taper outward and away from an interior space in a longitudinal direction from the first retainer end to the second retainer end to engage the first battery in order to dispose the first battery in a storage position in the battery holder and, in the second position, is configured to at least partially recess within a chamber of the battery holder to disengage from the first battery to allow the first battery to move from the storage position; and a cartridge having a tip end and an actuator end configured to couple to at least one of the front end or the rear end of the battery holder and further configured to hold a second battery in an enclosure, wherein when the cartridge is decoupled from the battery holder, the retainer member of the battery holder is in the first position, and when the cartridge is coupled to the battery holder, the retainer member of the battery holder is in the second position.

2. The system of claim 1, wherein the retainer member comprises an electrically conductive material, and the retainer member is positioned within the battery holder to engage terminals of the first battery in the storage position.

3. The system of claim 1, further comprising:

one or more electrical leads coupled to the retainer member.

4. The system of claim 1, wherein:

the tip end comprises an opening including two first opposite sidewalls in the opening, an interior portion distal to the actuator end comprises two second opposite sidewalls in the interior portion, and a cartridge opening frame width between the two first opposite sidewalls in the opening is less than a cartridge interior width between the two second opposite sidewalls in the interior portion.

5. The system of claim 1, wherein the cartridge receives the first battery from the battery holder into the cartridge.

6. The system of claim 1, wherein the cartridge comprises an actuator configured to push the second battery into the battery holder.

7. The system of claim 6, wherein the actuator is configured to guide the first battery into the enclosure of the cartridge.

8. The system of claim 1, further comprising a second cartridge, wherein:

the tip end of the cartridge couples to the front end of the battery holder; and a second tip end of the second cartridge couples to the rear end of the battery holder and a second actuator end of the second cartridge comprises an actuator configured to push through at least a portion of the second cartridge in a direction from the second actuator end toward the second tip end of the second cartridge.

9. The system of claim 1, further comprising a cartridge array including one or more cartridges, the cartridge array configured to move any one of the one or more cartridges in the cartridge array to align and couple with at least one of the front end or the rear end of the battery holder.

10. A method comprising:

aligning a first cartridge to couple to a battery holder, the battery holder comprising:

a first housing storing a first battery, the first housing extending longitudinally between a front end and a rear end and having an inner surface that defines an interior space, retainer member receptacles, each retainer member receptacle of the retainer member receptacles comprising a perimeter wall extending away from the inner surface and defining a chamber, and a front retainer member proximate the front end and a rear retainer member proximate the rear end of the first housing, each of the front retainer member and the rear retainer member comprising a first retainer end and a second retainer end, and configured to move between a first position and a second position, wherein in the first position, each of the front retainer member and the rear retainer member tapers outward and away from the interior space in a longitudinal direction from the first retainer end to the second retainer end, and in the second position, each of the front retainer member and the rear retainer member is at least partially recessed within respective chambers of the retainer member receptacles;

coupling the first cartridge to the battery holder such that a portion of the first cartridge engages the front retainer member and moves the front retainer member from the first position to the second position; and pushing, from a second cartridge comprising a second housing storing a second battery, the second battery into the first housing at the rear end and moving the first battery into the first cartridge, wherein the second battery engages the rear retainer member and moves the rear retainer member from the first position to the second position.

11. The method of claim 10, further comprising:

pushing an actuator inside the second cartridge to push the second battery towards the battery holder, wherein the actuator is coupled to an actuator end of the second cartridge.

12. The method of claim 10, further comprising decoupling the first cartridge from the battery holder, thereby causing the front retainer member to move to the first position, wherein in the first position, the front retainer member engages a battery terminal of the second battery.

13. The method of claim 12, wherein the front retainer member comprises an electrically conductive material, and engagement with the battery terminal establishes an electrical connection between the second battery and the front retainer member.

14. The system of claim 1, wherein the battery holder comprises an electrical lead, and the retainer member comprises electrically conductive material coupled to the electrical lead.

15. The system of claim 1, wherein the retainer member is hingedly coupled to the battery holder at the tip end of the retainer member.

16. The system of claim 1, wherein, in the first position, the retainer member is configured to electrically couple with battery terminals of the first battery when the first battery is in the storage position.

17. The system of claim 1, wherein the retainer member is biased towards the first position.

18. The system of claim 1, wherein the retainer member is spring loaded to permit the retainer member to move between the first position and the second position.

19. The system of claim 1, wherein the battery holder comprises a housing extending between the front end and the rear end.

* * * * *